US011964762B2

(12) United States Patent
Staab et al.

(10) Patent No.: US 11,964,762 B2
(45) Date of Patent: Apr. 23, 2024

(54) COLLABORATIVE 3D MAPPING AND SURFACE REGISTRATION

(71) Applicant: Raytheon Company, Tewksbury, MA (US)

(72) Inventors: Torsten A. Staab, Bristow, VA (US); Steven B. Seida, Wylie, TX (US); Jody D. Verret, Rockwall, TX (US); Richard W. Ely, Lewisville, TX (US); Stephen J. Raif, Sachse, TX (US)

(73) Assignee: Raytheon Company, Tewksbury, MA (US)

( * ) Notice: Subject to any disclaimer, the term of this patent is extended or adjusted under 35 U.S.C. 154(b) by 373 days.

(21) Appl. No.: 17/171,544

(22) Filed: Feb. 9, 2021

(65) Prior Publication Data

US 2021/0256722 A1 Aug. 19, 2021

Related U.S. Application Data

(60) Provisional application No. 62/975,016, filed on Feb. 11, 2020.

(51) Int. Cl.
*B64C 39/02* (2023.01)
*B64U 101/30* (2023.01)
(Continued)

(52) U.S. Cl.
CPC .......... *B64C 39/024* (2013.01); *G01S 17/894* (2020.01); *G06T 7/593* (2017.01);
(Continued)

(58) Field of Classification Search
CPC ... B64C 39/024; G01S 17/894; G01S 7/4808; G01S 17/42; G01S 17/86; G01S 17/89;
(Continued)

(56) References Cited

U.S. PATENT DOCUMENTS

2005/0031197 A1* 2/2005 Knopp ................... G01C 11/06
382/154
2013/0135440 A1* 5/2013 Ohtomo ............... G05D 1/0094
348/46
(Continued)

FOREIGN PATENT DOCUMENTS

| CN | 108876828 A | 11/2018 |
|---|---|---|
| CN | 107274380 B | 10/2019 |

(Continued)

OTHER PUBLICATIONS

"International Application Serial No. PCT/US2021/017410, International Search Report dated May 14, 2021", 4 pgs.

(Continued)

*Primary Examiner* — Chan S Park
*Assistant Examiner* — Daniel C Chang
(74) *Attorney, Agent, or Firm* — Schwegman Lundberg & Woessner, P.A.

(57) ABSTRACT

Subject matter regards generating a 3D point cloud and registering the 3D point cloud to the surface of the Earth (sometimes called "geo-locating"). A method can include capturing, by unmanned vehicles (UVs), image data representative of respective overlapping subsections of the object, registering the overlapping subsections to each other, and geo-locating the registered overlapping subsections.

18 Claims, 12 Drawing Sheets

(51) Int. Cl.
    *G01S 17/894*     (2020.01)
    *G06T 7/593*     (2017.01)
    *G06V 20/13*     (2022.01)

(52) U.S. Cl.
    CPC .......... *G06V 20/13* (2022.01); *B64U 2101/30* (2023.01); *G06T 2207/10028* (2013.01)

(58) Field of Classification Search
    CPC .................. G01S 17/931; G06T 7/593; G06T 2207/10028; G06T 7/73; G06T 7/74; G06T 2207/10016; G06T 2207/10032; G06T 2207/30181; G06T 7/32; G06V 20/13; B64U 2101/30
    See application file for complete search history.

(56) References Cited

U.S. PATENT DOCUMENTS

| | | | |
|---|---|---|---|
| 2015/0262335 A1* | 9/2015 | Padwick | G06T 3/4038 |
| | | | 345/629 |
| 2017/0084037 A1 | 3/2017 | Barajas Hernandez et al. | |
| 2018/0040137 A1* | 2/2018 | Barajas Hernandez | G06V 10/443 |
| 2019/0285412 A1* | 9/2019 | Jarroush | G08G 5/0013 |
| 2020/0043195 A1* | 2/2020 | Ono | G06T 3/4038 |
| 2021/0358315 A1* | 11/2021 | Moster | B64D 47/08 |

FOREIGN PATENT DOCUMENTS

| | | |
|---|---|---|
| TW | 202214487 A | 4/2022 |
| TW | I820395 | 11/2023 |
| WO | WO-2021163157 A1 | 8/2021 |

OTHER PUBLICATIONS

"International Application Serial No. PCT/US2021/017410, Written Opinion dated May 14, 2021", 8 pgs.

"Taiwanese Application Serial No. 110105355, Voluntary Amendment filed Jun. 15, 2021", with English translation of claims, 133 pgs.

Brown, Andrew P, et al., "Persistent electro-optical/infrared wide-area sensor exploitation", Evolutionary and Bio-Inspired Computation: Theory and Applications VI, SPIE, 1000 20th St. Bellingham WA 98225-6705 USA vol. 8402, No. 1, (May 11, 2012), 1-9.

Gianpaolo, Conte, et al., "Vision-Based Unmanned Aerial Vehicle Navigation Using Geo-Referenced Information", EURASIP Journal on Advances in Signal Processing, vol. 2009, No. 1, (Jun. 7, 2009).

"International Application Serial No. PCT/US2021/017410, International Preliminary Report on Patentability dated Aug. 25, 2022", 10 pgs.

"Taiwanese Application Serial No. 110105355, Office Action dated Mar. 4, 2022", with machine translation, 16 pgs.

"Taiwanese Application Serial No. 110105355, Response filed May 31, 2022 to Office Action dated Mar. 4, 2022", with English translation of claims, 186 pgs.

"Taiwanese Application Serial No. 110105355, Decision of Rejection dated Oct. 5, 2022", W/Machine Translation, 7 pgs.

"Taiwanese Application Serial No. 110105355, Office Action dated May 4, 2023", W/English Translation, 5 pgs.

"Taiwanese Application Serial No. 110105355, Response Filed Dec. 6, 2022 to Decision of Rejection dated Oct. 5, 2022", W/Machine Translation, 17 pgs.

"Taiwanese Application Serial No. 110105355, Response Filed Jun. 30, 2023 to Office Action dated May 4, 2023", With English claims, 123 pages.

* cited by examiner

US 11,964,762 B2

COLLABORATIVE 3D MAPPING AND SURFACE REGISTRATION

CLAIM OF PRIORITY

This patent application claims the benefit of U.S. Provisional Application Ser. No. 62/975,016, filed Feb. 11, 2020, which is incorporated by reference herein in its entirety.

TECHNICAL FIELD

Some embodiments described herein generally relate to generating a three-dimensional (3D) mapping and registering the generated 3D mapping to a surface.

BACKGROUND

Generating a 3D point cloud can be resource intensive. The generation of the point cloud can include gathering two-dimensional (2D) images (e.g., satellite imagery, ground imagery (images taken from a camera on the ground), or an elevation therebetween) and performing photogrammetry, performing a light detection and ranging (LIDAR) scan, a human generating a computer-aided design (CAD) drawing, or the like. Each of these techniques has associated difficulties, tolerances, and resource requirements, which can be cost or resource prohibitive.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 1 illustrates, by way of example, a diagram of an embodiment of a method for 3D point set generation and registration.

DETAILED DESCRIPTION

Aspects of embodiments regard improving point cloud generation or registration of the point cloud to a geo-location of the Earth or other surface.

Figure 1:
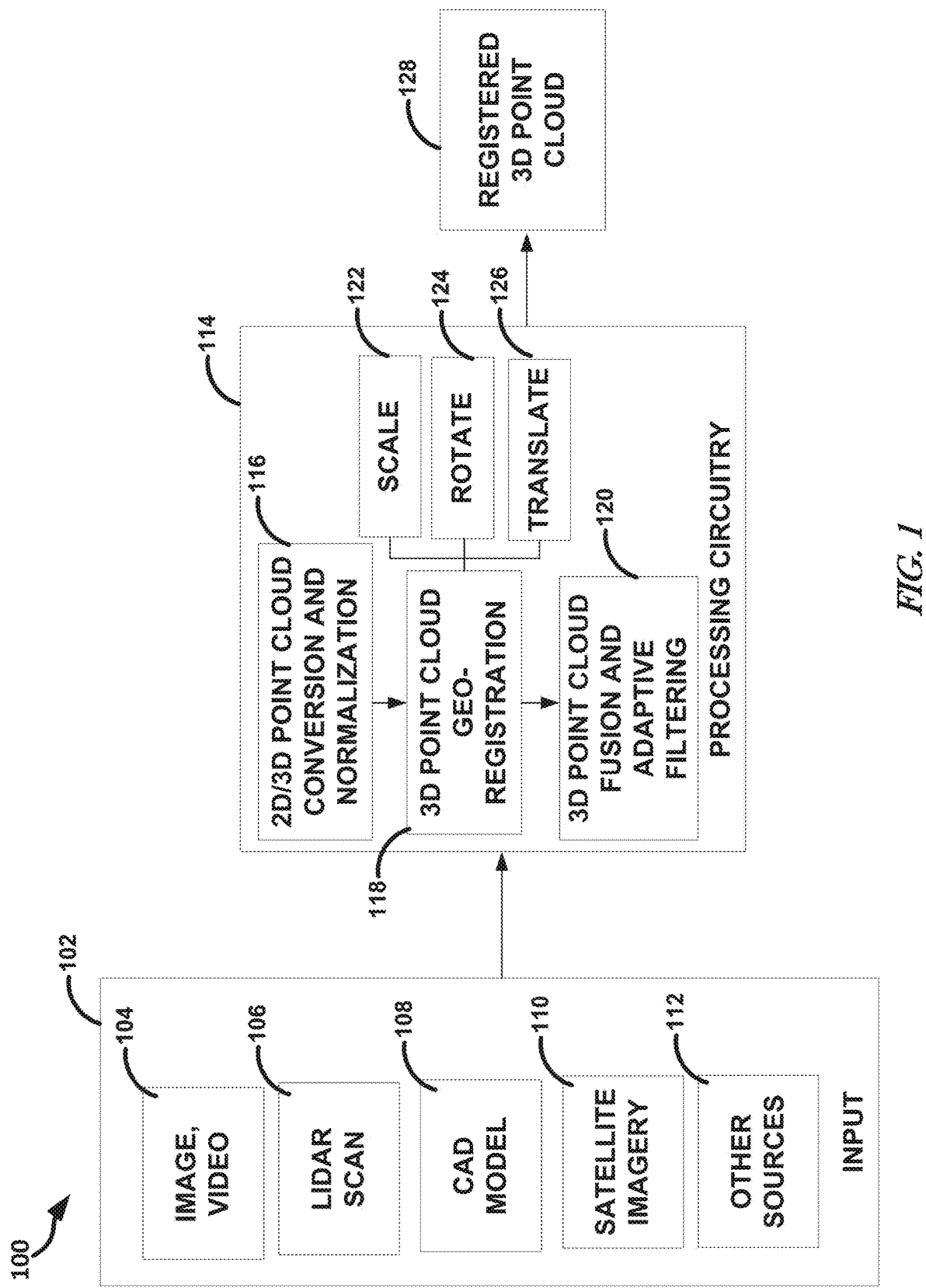
FIG. 1 illustrates, by way of example, a conceptual block diagram of an embodiment of a technique for 3D point cloud registration, such as with error propagation.

FIG. 1 illustrates, by way of example, a conceptual block diagram of an embodiment of a technique for 3D point cloud registration, such as with error propagation. A system of FIG. 1 includes input 102 provided to processing circuitry 114. The processing circuitry 114 generates output in the form of a 3D point cloud 128. The input 102 can include one or more of an image or video 104, a light detection and ranging (LIDAR) scan 106, a three-dimensional (3D) computer-aided drafting (CAD) model 108, satellite imagery 110, or other data 112. The input 102 can be processed into two or more 3D point clouds before being provided to the processing circuitry 114.

The image, video 104 can include a red, green, blue (RGB), infrared (IR), black and white, grayscale, or other intensity image. The image, video 104 can include a video that comprises frames. Photogrammetry can be performed on the data of image, video 104, such as to generate one of the 3D point clouds.

Photogrammetry can include performing a geometric bundle adjustment on the two-dimensional (2D) images, to register the geometry of the 2D images to each other. The bundle adjustment can adjust geometry of an image of the images to be consistent with geometry of other images of the images. The geometry can be defined in metadata, such as by using rational polynomial coefficients (RPC). Other image registration techniques are possible. For example, 2D images not previously associated with the 3D point cloud can be registered to the 3D point cloud. Tie points can be identified between each 2D image and the 3D point cloud. The geometry of each 2D image can be adjusted to match the 3D point cloud by using an affine transformation.

The LIDAR scan 104 can be generated by illuminating a target with a laser light and measuring the reflected light with a sensor. Differences in laser return times and wavelengths can then be used to make one or more of the 3D point clouds. This is because these differences can be used to determine distance to the object off of which the light was reflected and returned to the sensor. LIDAR 3D point clouds often have no intensity information. For the LIDAR case, and others, it can be useful to attribute the 3D point cloud with intensity or color data from an image that covers the same area of interest. Further discussion on this point is provided elsewhere herein.

The CAD model 108 is a human-designed (e.g., with or without computer aid) 2D or 3D model, such as the blueprint of a building. The CAD model 108 is defined by geometrical parameters and readily adjustable by a human using a computer.

The satellite imagery 110 includes images generated at high altitudes from one or more cameras of a satellite or satellites. The satellite image provides a nadir, or near-nadir view of a geographical location. The nadir view is of a point on a celestial sphere directly below an observer (e.g., the point on the sphere closest the observer).

Other sources 112 can include other man-made measurements (e.g., thermal imaging), computer aided measurements, or other data that can be used to generate a 3D point cloud of the geographical region.

The processing circuitry 114 can include hardware, software, firmware, or a combination thereof, configured to implement the operations of registering 3D point clouds to each other. Hardware can include one or more electric or electronic components configured to electrical signals to indicate results of the operation. Electric or electronic components can include one or more transistors, resistors, capacitors, diodes, inductors, switches, logic gates (e.g., AND, OR, XOR, negate, buffer, or the like), multiplexers, power supplies, regulators, analog to digital or digital to analog converters, amplifiers, processors (e.g., application specific integrated circuits (ASIC), field programmable gate array (FPGA), graphics processing units (GPUs), central processing units (CPUs), or the like), or the like electrically coupled to perform the operations.

The operations for 3D point cloud registration can include 2D/3D point cloud conversion and normalization at operation 116, 3D point cloud geo-registration at operation 118, and 3D point cloud fusion and adaptive filtering at operation 120. These operations are discussed in more detail below.

The operation 118, in general, can include determining a scale 122 factor adjustment, a rotation 124 adjustment, and a translation 126 adjustment between the 3D point clouds to be registered. The operation 118 can include using an iterative, normalized cross-covariance technique, that minimizes a least squares difference between tie-points ground control points (GCPs), or the like. This is discussed in more detail below. The result of the registration is a registered 3D point cloud 128 that inherits the best errors (smallest errors) in the 3D point cloud inputs. Again, more detail is provided below.

Figure 2:
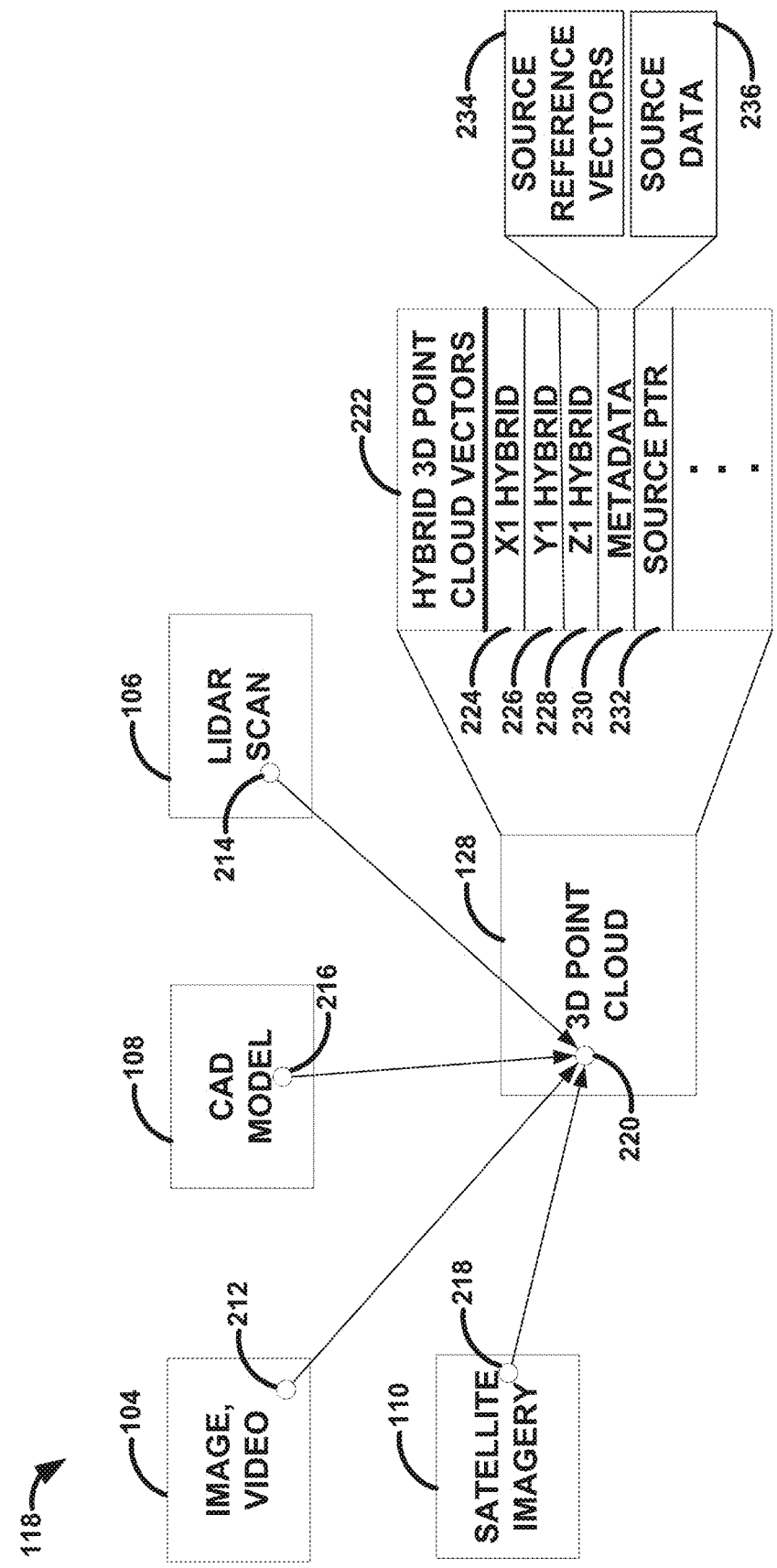
FIG. 2 illustrates, by way of example, a diagram of an embodiment of a technique of performing the operation of the processing circuitry.

FIG. 2 illustrates, by way of example, a diagram of an embodiment of a technique of performing the operation 118 of the processing circuitry 114. As previously mentioned, more detail can be found below. In general, tie points 212, 214, 216, 218 between the various 3D point cloud inputs can be identified. In the example of FIG. 2, the 3D point clouds include the LIDAR scan 106, the CAD model 108, the image, video 104, and the satellite imagery 110. More or fewer 3D point clouds can be used. The tie points 212, 214, 216, 218 are data points that correspond to a same geographic location. For example, a corner of a structure, a high elevation point, or the like, can make for a good tie point. The tie points 212, 214, 216, 218 can be used to determine how to adjust the corresponding 3D point clouds to be registered to generate the 3D point cloud 128. The tie point 220 corresponds to the registered location of the tie points 212, 214, 216, 218.

In performing the operation 118 an accounting of the registered points 222, and the corresponding data that was used to the generate the registered points 222 can be performed. The registered points 222 can include an x value 224, a y value 226, a z value 228, metadata 230, and source pointers 232. The metadata 230 can include source reference vectors 234 indicating data source (e.g., the image, video 104, LIDAR scan 106, CAD model 108, or satellite imagery 110, etc.) from which the registered points 222 were determined and the source data 236 of those sources.

A system, device, or method to implement the techniques of FIG. 1 or 2 can provide a hybrid, multi-source, multi-resolution 3D point cloud creation and enrichment through multi-source, multi-modal 3D point cloud ingest and fusion. The techniques of FIG. 1 or 2 can provide an ability to create a more comprehensive (as compared to prior techniques), multi-resolution, 3D hybrid point cloud by combining a sparse 3D point cloud with a dense 3D point cloud, a low-resolution 3D point cloud with a high-resolution 3D point cloud or the like. The techniques of FIG. 1 or 2 can provide an ability to fill in a missing section of a 3D point cloud, such as by using another 3D point cloud.

The techniques of FIGS. 1 and 2 can provide an ability to replace or augment noisy/low quality 3D point cloud sections with high fidelity data from other location-relevant 2D and 3D data sources. The techniques of FIGS. 1 and 2 can provide an ability to detect error and correct a 3D point cloud through multi-3D point cloud cross-correlation & validation. A resulting hybrid 3D point cloud can preserve, through metadata, data source lineage that allows users to leverage metadata (e.g., pixel color and intensity, object classifications and dimensions) from fused sources.

The techniques of FIGS. 1 and 2 provide a hybrid 3D point cloud-derived location intelligence (e.g., detection, localization, and classification of permanent or stationary objects in a scene or environmental conditions (e.g., power or phone lines, radiation areas that may not be detectable by the onboard sensors of an unmanned aerial vehicle (UAV) or an unmanned ground vehicle (UGV)) that can aid in obstacle avoidance and planning of complex mapping operations. The techniques of FIGS. 1 and 2 can provide an ability to incorporate fusion criteria, such as trustworthiness of the data source or classification levels.

The techniques of FIGS. 1 and 2 provide a user-controllable filtering and criteria, such as classification level of a data source or trustworthiness of a data source, quality, or age. The techniques of FIGS. 1 and 2 provide an ability to control which areas (e.g., rooms within a building) and/or objects get included or excluded in a resulting, hybrid 3D point cloud. The techniques of the FIGS. provide an ability to link other measurements (e.g., temperature, radiation, noise level, humidity) to each data point in the resulting hybrid 3D point cloud (e.g., via a graph, multi-dimensional array, hash table, dictionary, or linked list representation).

The extensible, hybrid cloud source vector 222 allows the resulting hybrid 3D point cloud to also store non-sensitive (e.g., unclassified) and sensitive (e.g., classified) point cloud data in the same cloud. Hybrid point cloud access controls, for example, can be enforced by controlling the visibility of the source data vectors 222, or encrypting the sensitive source data elements 236 of the hybrid point cloud.

Figure 3:
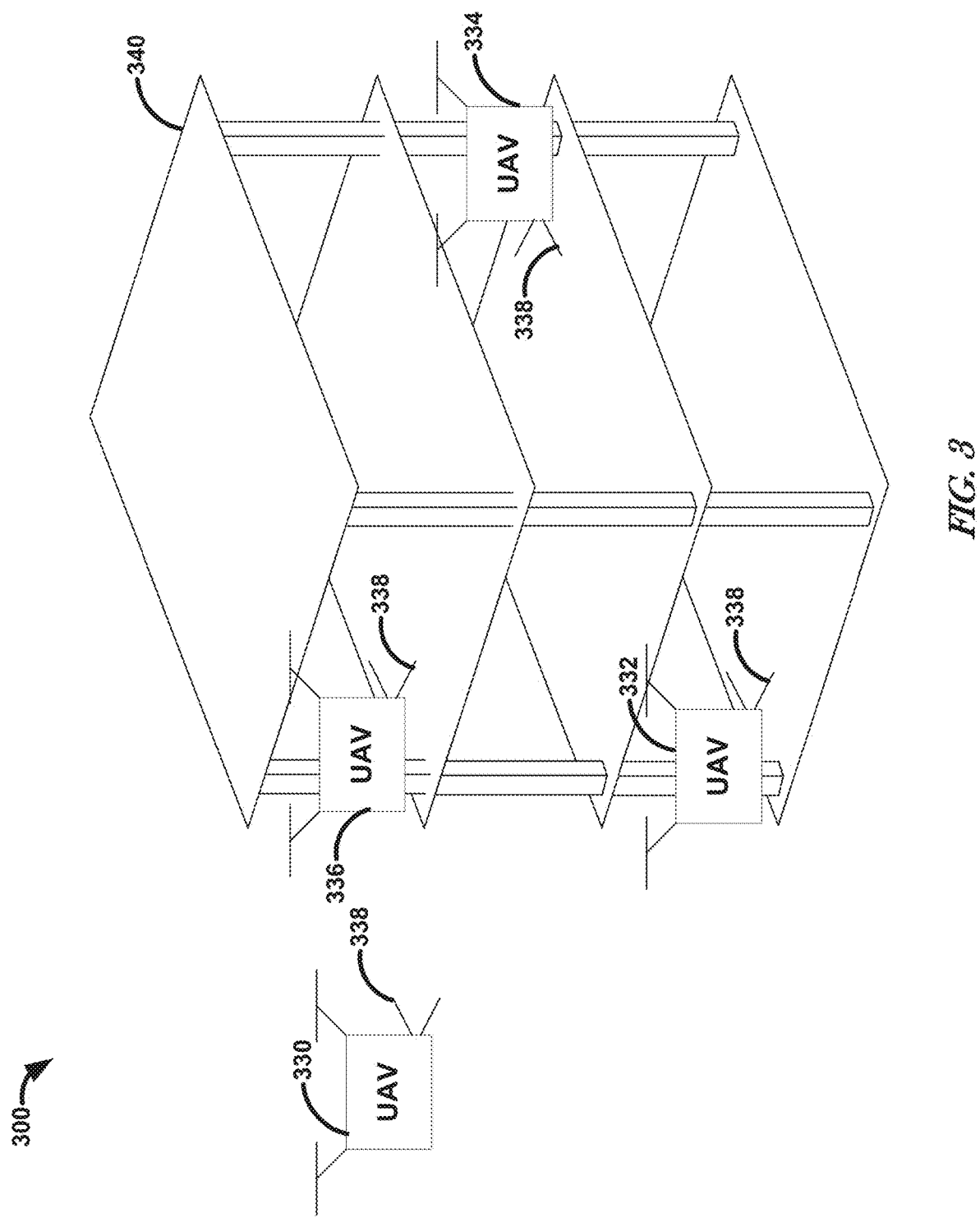
FIG. 3 illustrates, by way of example, a conceptual block diagram of an embodiment of a collaborative system for 3D point cloud generation.

FIG. 3 illustrates, by way of example, a conceptual block diagram of an embodiment of a system 300 for 3D point cloud generation. The 3D point cloud generated using the system 300 can be used as an input 102 to the processing circuitry 114, for example. The system 300 as illustrated includes unmanned aerial vehicles (UAVs) 330, 332, 334, 336, with imaging devices (indicated by diverging lines 338). The imaging devices can include intensity or non-intensity imaging devices. Examples of intensity imaging device include an RGB, grayscale, black and white, infrared, or another camera. Examples of non-intensity imaging devices include LIDAR, or the like. The UAVs 330, 332, 334, 336 can be programmed to capture image data of an object 340 or a geographical region of interest. The UAVs 330, 332, 334, 336 can cooperatively capture sufficient image data of the object 340 to generate a 3D point cloud of the object 340.

The concepts presented herein regarding UAVs are not limited to drone-/UAV-collected data. Concepts can also apply to UGVs, unmanned vessels, and manual-/human-driven data and collection methods.

Figure 4:
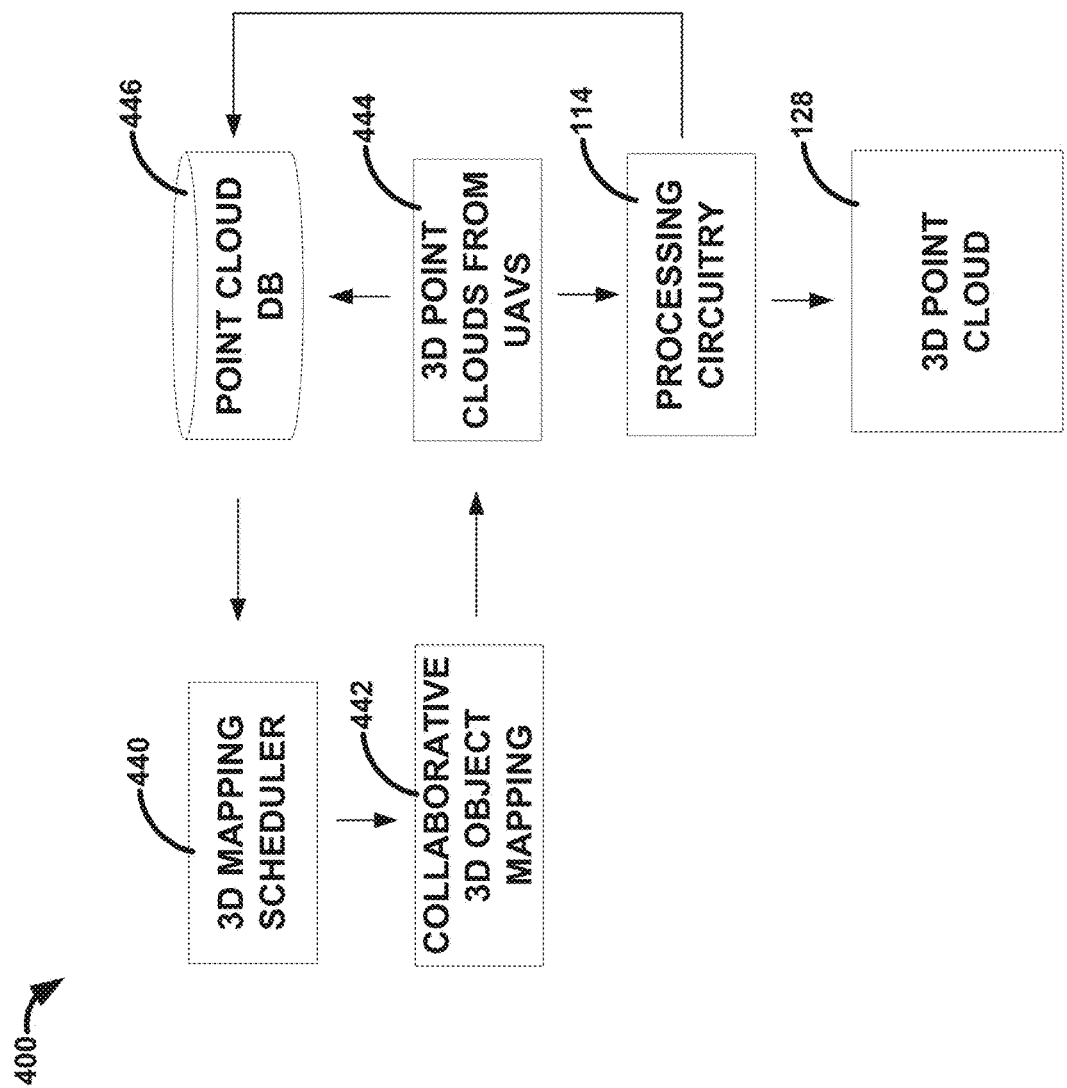
FIG. 4 illustrates, by way of example, a diagram of an embodiment of a system for generating the registered 3D point cloud.

FIG. 4 illustrates, by way of example, a diagram of an embodiment of a system 400 for generating the registered 3D point cloud 128. The system 400 as illustrated includes 3D mapping scheduler 440, a collaborative 3D object mapping operation 442, 3D point clouds 444 from the UAVs 330, 332, 334, 336, a 3D point cloud database (DB) 446, the processing circuitry 114, and the registered 3D point cloud 128 (both from FIG. 1).

The 3D mapping scheduler 440 can command the UAVs 330, 332, 334, 336 what tasks to perform and when. The 3D mapping scheduler 440 can change the task or time to perform the task after a mission has begun. The UAVs 330, 332, 334, 336 can communicate and alter the task or timing on their own. The UAVs 330, 332, 334, 336 can be autonomous or semi-autonomous.

The 3D mapping scheduler 440 can provide the UAVs 330, 332, 334, 336 with a task that includes a geographic region to be modelled, a resolution of the model to be generated, a technique to be used in generating the model (e.g., color image, satellite image, radiation or temperature scan, LIDAR, etc.), or one or more time constraints in performing the tasks. The UAVs 330, 332, 334, 336 can operate to satisfy the schedule and constraints provided by the scheduler 440. While illustrated as a centralized unit, the scheduler 440 does not need to be a centralized unit. The scheduler can be distributed across multiple resources (e.g., UAVs) and run locally/on-board (e.g., as an agent) to provide a distributed dynamic scheduler. Such an implementation can include the UAVs 330, 332, 334, 336 communicating and planning tasks among themselves.

These operations of the UAVs 330, 332, 334, 336 are part of collaborative 3D object mapping operation 442. The result of the 3D mapping operation 442 can be a 3D point cloud 444 from the UAVs. As previously discussed, the discussion regards UAVs, but also applies to other manned or unmanned vehicles, such as ground, water, air vehicles, or a combination thereof.

The 3D point cloud 444 can be stored in a point cloud database 446. The point cloud database 446 can include a memory device for storing one or more point clouds, such as the 3D point clouds 444 or the registered point cloud 128. The 3D point clouds 444 from the UAVs 330, 332, 334, 336 can be provided to the processing circuitry 114. The processing circuitry 114 can register the point clouds 444 to generate the registered point cloud 128.

Figure 5:
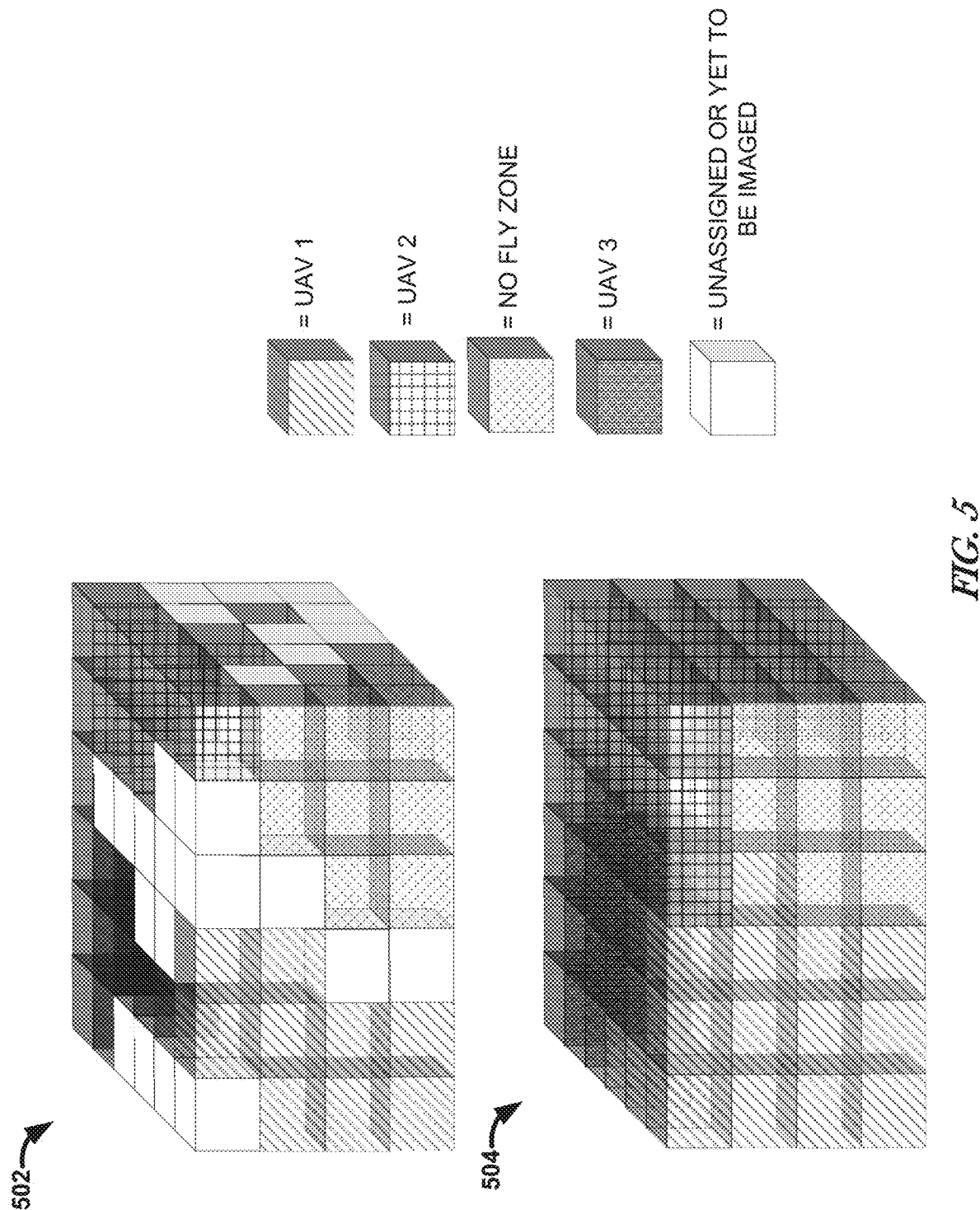
FIG. 5 illustrates, by way of example, a diagram of an embodiment of a volume that is being mapped by UAVs.

FIG. 5 illustrates, by way of example, a diagram of an embodiment of a volume that is being mapped by UAVs, such as three of the UAVs 330, 332, 334, 336. Currently, part of the volume, as indicated at 502, is partially mapped. The different patterns on voxels or subsections of the volume indicate which UAV has mapped the subsection (if a UAV has mapped the subsection). The scheduler 440 or the UAVs 330, 332, 334, 336 can determine which UAV will map the currently unimaged subsections based on a variety of criteria (e.g., object priorities, speed, cost, distances, available sensors, required scan resolution, remaining flight times/battery life, UAV health status, etc.). An example assignment of the mapping is provided at 504.

An advantage of one or more embodiments of FIGS. 1-5 can include one or more of: enabling collaborative, concurrent, inside-out and outside-in 3D mapping of objects of interests (e.g., buildings, tunnels, or other objects) using a swarm of two or more autonomous, semi-autonomous, or man-controlled drones; providing an ability to leverage pre-existing 3D point clouds and 3D point clouds generated through other means (e.g., CAD models, photogrammetry) to speed up mapping process, preventing replication of effort, increasing fault-tolerance, and/or reducing cost; generating a fused 3D point cloud that can be composed of multi-resolution 3D point clouds; providing a collaborative mapping and hybrid 3D point cloud creation process supports dynamic filtering based on user-definable criteria (e.g., exclude basement from mapping, specified resolution, specified time frame, specified technique, or the like); efficiently delegating mapping objectives/areas of interests using pre-assigned mission planner or assigned at run time by a dynamic scheduler; providing a dynamic scheduler that enables ad-hoc re-tasking of mapping objectives in response to changing mapping objectives, environmental conditions, or drone(s) health status (e.g., battery status, sensor or motor failure, data storage constraints, change in weather conditions, or the like); providing a swarming solution with autonomous mapping drones, since drones can negotiate/self-organize and potentially trade their 3D mapping assignments/objectives based on a variety of criteria or conditions (e.g., tasking from a failing drone gets automatically re-assigned to another qualified drone); change in mapping priorities/order; auto-selection of closest drone(s) to targeted area(s); auto-selection of drone with fastest or most qualified sensor payload; selection based on drone's health status (e.g., remaining battery life or storage, strongest downlink signal, or the like); providing an ability to incorporate 3D no-fly zones and exclusion area definitions in mission planning and scheduling, providing an ability to explicitly task drones or allow autonomous, onboard decision making (e.g., based on mission objectives and/or current conditions and location) to adaptively switch between sensors (e.g., Lidar, IR, or high definition (HD) cameras), turn sensors on and off, and adjust sampling rates in flight to speed up mapping, optimize storage utilization, speed up onboard analytics, extend flight time/battery life, or reduce electronic signature; providing an ability to link in UTM (Unmanned Traffic Management) systems (e.g., Federal Aviation Administration (FAA), Airmap) in 3D mapping planner, dynamic scheduler, and platform's real-time flight control system to avoid air space violations and collisions with other aircraft and unmanned systems; providing an ability to 3D map in large area or complex object in multiple stages (e.g., first use a survey drone to rapidly generate a coarse, low-res 3D point cloud of the area of interest, then use a geo-spatial portioning technique to subdivide the resulting 3D model (e.g., by floors, volume, openings (windows, doors), voxels, or sectors), and then task the survey drone(s) to explore certain areas/sub sections (sequentially or in parallel) within the coarse/quick scan-generated 3D model; or providing a 3D divide-and-conquer approach, enabling parallel, multi-drone and priority-driven 3D exploration and mapping.

Figure 6:
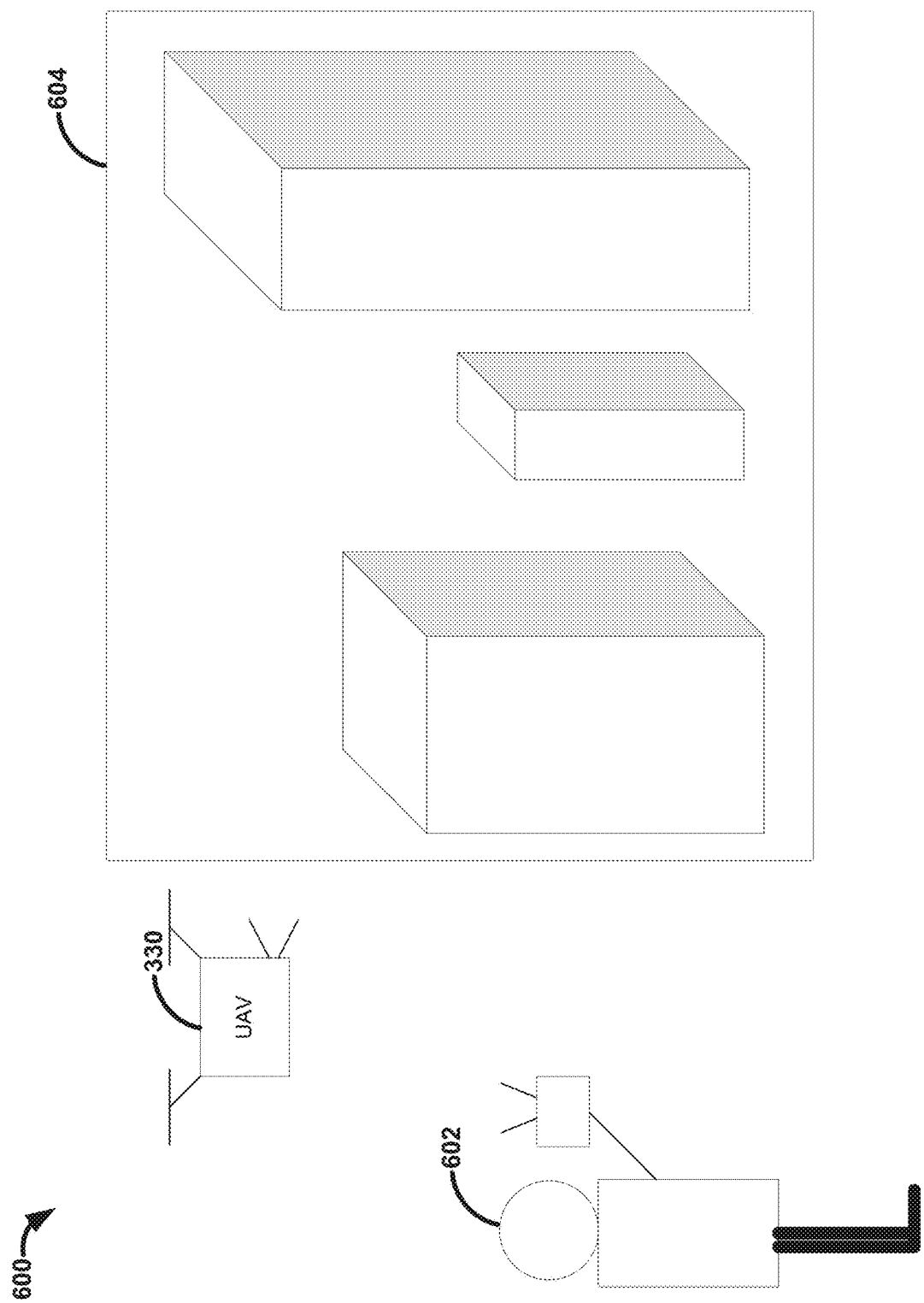
FIG. 6 illustrates, by way of example, a diagram of an embodiment of a system for 3D point cloud generation and geo-registration.

FIG. 6 illustrates, by way of example, a diagram of an embodiment of a system 600 for 3D point cloud generation and geo-registration. The system 600 as illustrated includes an operator 602, the UAV 330, and a geographical region 604 to be mapped. The operator 602 can operate the UAV 330, or the UAV 330 can operate autonomously or semi-autonomously to generate image data of the geographical region 604. In some instances, the UAV 330 can have a global positioning system (GPS) or the like that informs the UAV 330 of its location relative to the surface of the Earth. In these instances, the GPS coordinates can be used to register the 3D data to the surface of the Earth. In other instances, however, the UAV 330 does not have such a system. Note it is not necessary to have GPS data for the entire flight. GPS data for a portion of the flight can be used to register data from the entire flight. When the UAV does not have the positioning system, some other techniques can be used to register the 3D point cloud generated using the image data from the UAV 330 to the surface of the Earth.

Figure 7:
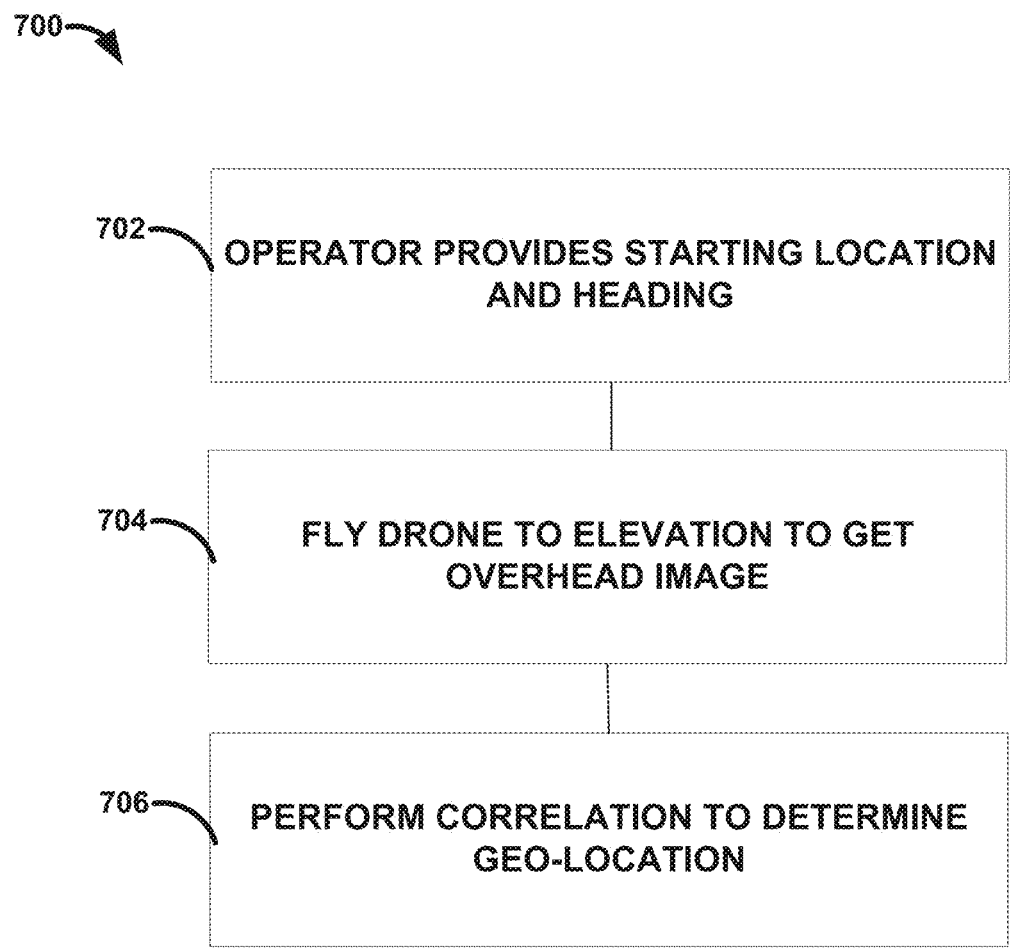
FIG. 7 illustrates, by way of example, a diagram of embodiments of operations that can aid in geo-locating a 3D point cloud.

Operations of the other techniques are provided regarding a method 700 provided in FIG. 7. Note that not all operations of FIG. 7 are required or even useful in all situations.

FIG. 7 illustrates, by way of example, a diagram of an embodiment of a technique 700 for registration of a 3D point cloud. The technique 700 for registration of the 3D point cloud generated by the UAV 330 can include the operator 602 providing a starting location and a heading of the UAV 330, at operation 702. The operation 702 is helpful, such as when no overhead imagery of the area or no 3D point cloud of the area is available. The heading and starting location can be determined using a compass, computing device, or the like. The heading and starting location can include an associated, estimated error. This data can be used to register the image data to the surface of the Earth. Using this technique, the initial heading and starting location can be used to associate the remaining 3D points to points on the surface of the Earth.

The technique 700 for registration of the 3D point cloud generated by the UAV 330 can include flying to a specified height and taking a nadir, or near nadir image of the starting location, at operation 704. The operation 704 is helpful, such as when overhead imagery or the 3D point cloud of the area are available. Overhead imagery often includes metadata, sometimes called rational polynomial coefficients (RPC), that detail locations of the pixels of the overhead imagery on the Earth. The image captured by the UAV 330 can then be registered (using normalized cross correlation of image chips, for example) to the available overhead imagery. In some embodiments, the UAV 330 can perform a LIDAR scan and take an image at the elevation. This data can be correlated with the overhead imagery to determine the starting location, at operation 706.

The geo-location registration can be performed with error (e.g., linear error or circular error, or a combination thereof) propagation. The linear error and circular error are best when correlating to a 3D point cloud, less accurate when correlating to overhead imagery, and even less accurate when only a starting heading and starting location are available. GPS data is about as accurate as an overhead imagery correlation.

The operation 704 can be helpful because the overhead imagery and the 3D point clouds are generally in nadir or near-nadir views of the tops of objects, while LIDAR from the UAV 330 sees the sides of objects in the imagery. To help correlate the LIDAR data to the overhead imagery or 3D point cloud, a nadir or near-nadir image can be generated of the starting location.

Figure 8:
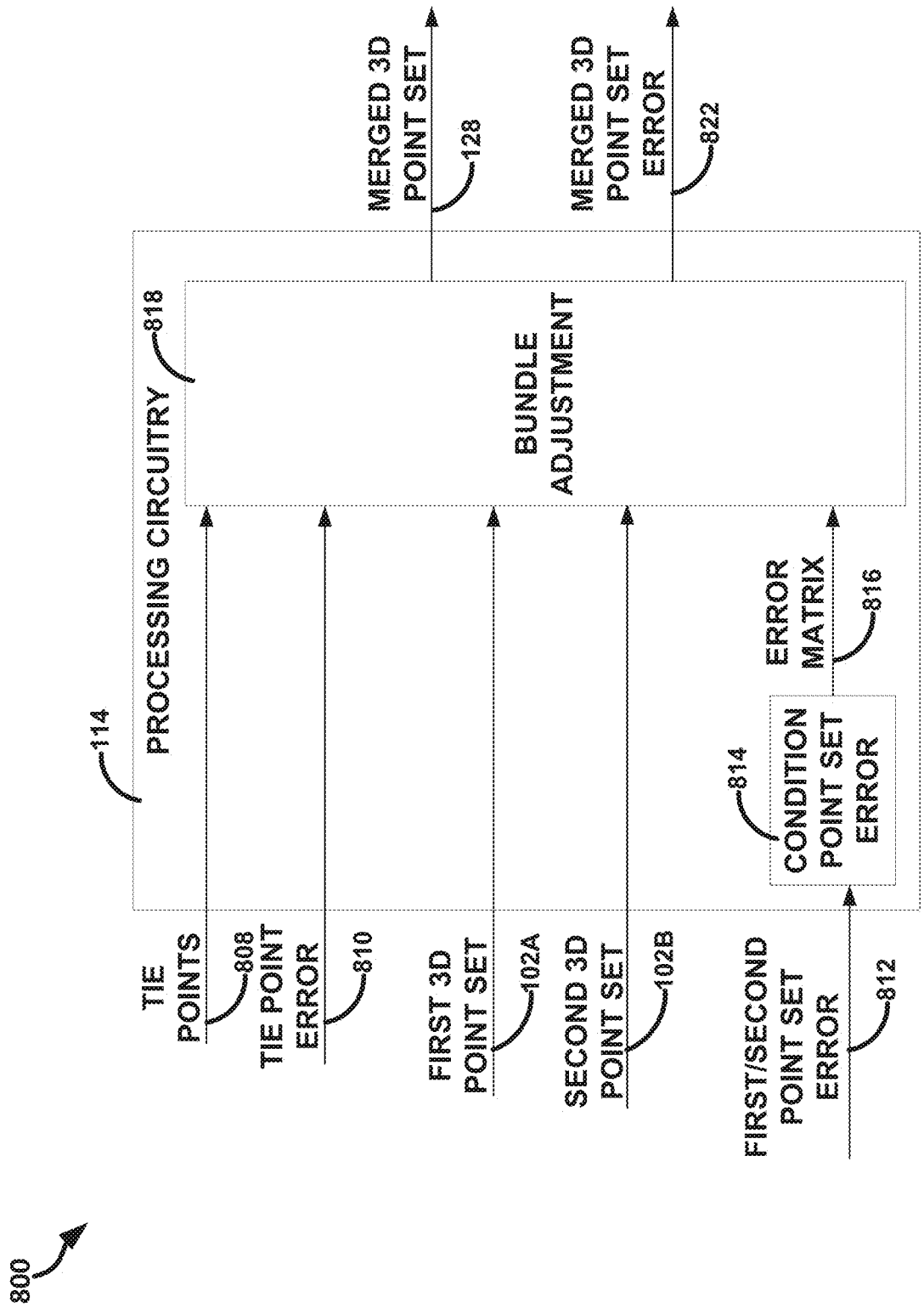
FIG. 8 illustrates, by way of an example, an embodiment of a system 800 for 3D point set registration and merging.
Figure 9:
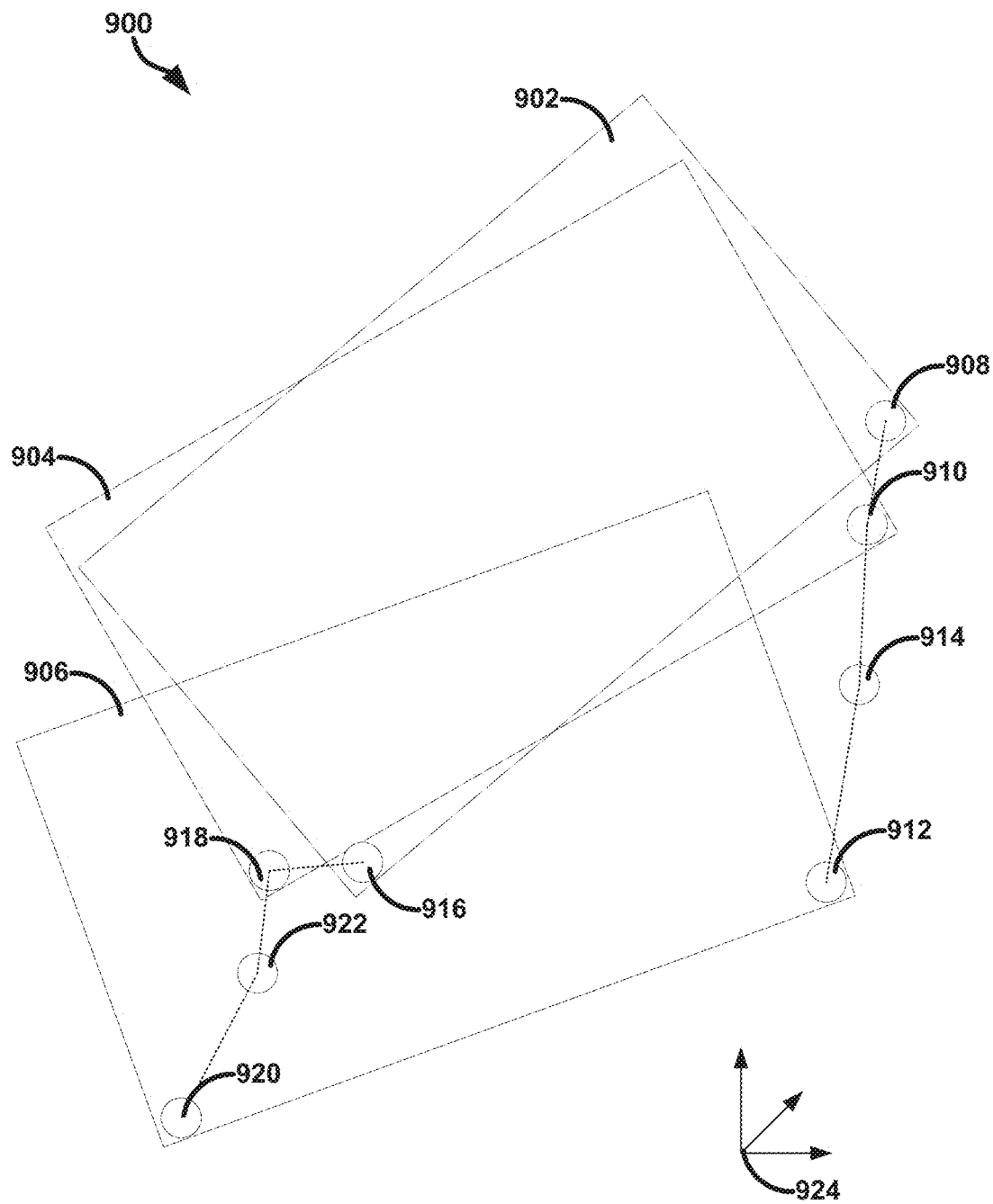
FIG. 9 illustrates an example diagram of an embodiment of the relationship between ground point coordinate estimates $\hat{V}_j$ and corresponding 3D data set observations $\tilde{V}_{ij}$.
Figure 10:
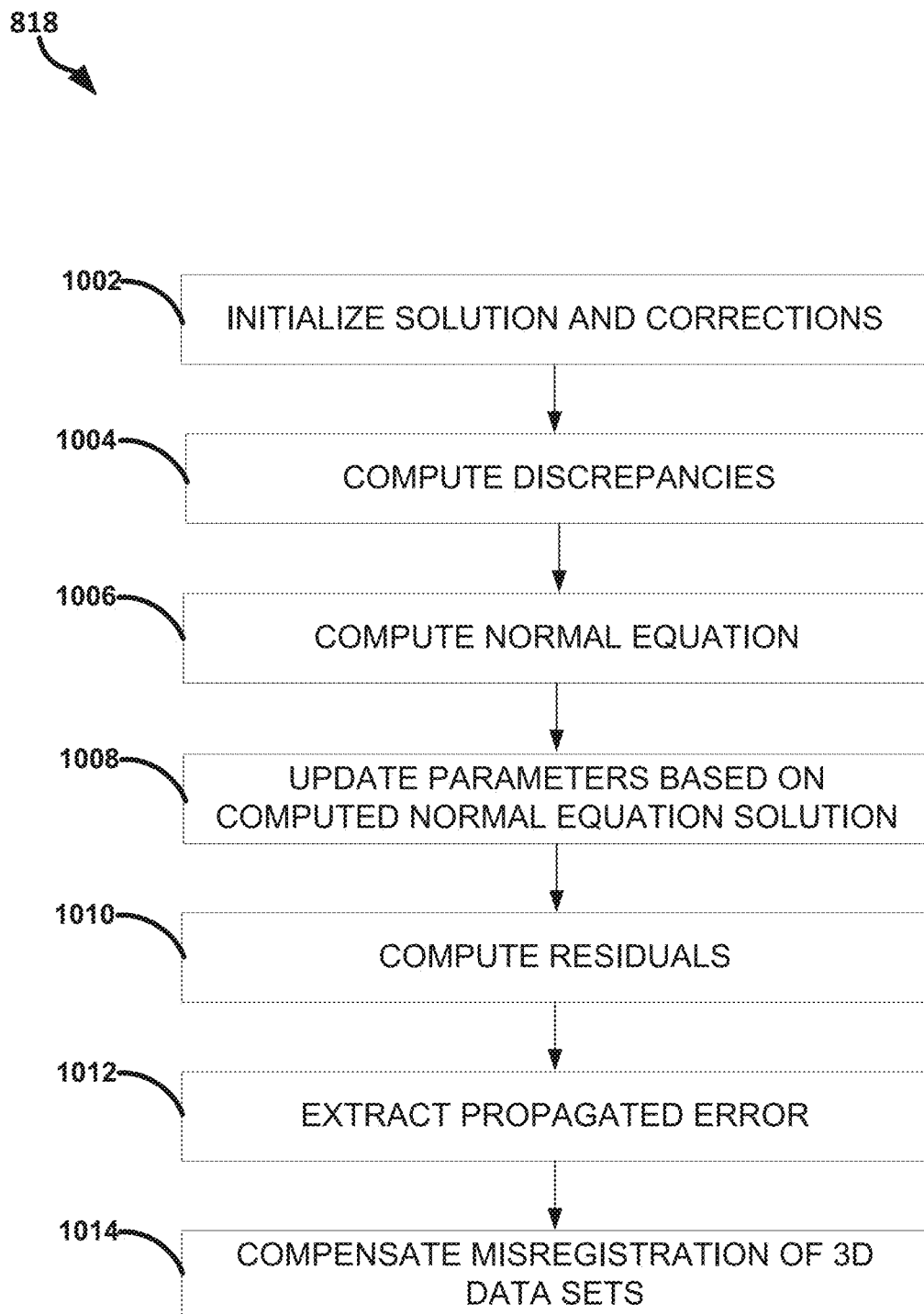
FIG. 10 illustrates an example of an embodiment of a bundle adjustment operation.

FIGS. 8-10 regard methods, systems, and devices for registering a first 3D point cloud (or a portion thereof) to a second 3D point cloud (or a portion thereof) to generate a merged 3D point cloud. One or more the first and second 3D point clouds can include an associated error. The associated error can be propagated to the merged 3D point cloud. The error of the 3D point cloud can be used in a downstream application. Example applications include targeting and mensuration. A targeteer (one who performs targeting) can benefit from the error to better inform their targeting location choice. A mensuration of an object can benefit from the error as well.

The merged 3D point clouds can include error that is better than any of the 3D point clouds individually. For example, if the first 3D point cloud includes a lower error (relative to the second 3D point cloud) in the x and y directions and the second 3D point cloud includes a lower error (relative to the first 3D point cloud) in the z direction, the merged 3D point cloud can include error bounded by the first 3D point cloud in the x and y directions and by the second 3D point cloud in the z direction. The merged point cloud can thus inherit the better of the errors between the first and second point clouds for a specified parameter.

FIG. 8 illustrates, by way of an example, an embodiment of a system 800 for 3D point set registration and merging. The system 800 can include the processing circuitry 114 that receives tie points 808, tie point error 810, a first 3D point set 102A, a second 3D point set 102B, and first or second point set error 812. The first or second point set error 812 includes error for at least one of the first 3D point set 102A and the second 3D point set 102B. The first or second point set error 812 can thus include error for the first 3D point set 102A, the second 3D point set 102B, or the first 3D point set 102A and the second 3D point set 102B.

The first 3D point set 102A or the second 3D point set 102B can include a point cloud, a 3D surface, or the like. The first 3D point set 102A and the second 3D point set 102B can include (x, y, z) data for respective geographic regions. The geographic regions of the first 3D point set 102A and the second 3D point set 102B at least partially overlap. One or more of the first point set 102A and the second point set 102B can include intensity data. Intensity data can include one or more intensity values, such as red, green, blue, yellow, black, white, gray, infrared, thermal, or the like. One or more of the first point set 102A and the second the point set 102B can include error data. The error data is illustrated as being a separate input in FIG. 1, namely the first or second point set error 812. The error data can indicate an accuracy of the corresponding point of the point set.

The tie points 808 can associate respective points between the first 3D point set 102A and the second 3D point set 102B. The tie points 808 can indicate a first point $(x_1, y_1, z_1)$ in the first 3D point set 102A, a second point $(x_2, y_2, z_2)$ in the second 3D point set 102B or an error associated with the tie point 808 (shown as separate input tie point error 810). The tie point error 810 can indicate how confident one is that the first and second points correspond to the same geographic location. The tie point error 810 can include nine entries indicating a covariance (variance or cross-covariance) between three variables. The three variables can be error in the respective directions (x, y, z). A matrix representation of the tie point error 810 is provided as $$\begin{bmatrix} e_x & e_{xy} & e_{xz} \\ e_{yx} & e_y & e_{yz} \\ e_{zx} & e_{zy} & e_z \end{bmatrix}$$

where the diagonal terms are respective variances in the given directions, and the off-diagonal terms are covariances between the directions.

The first or second point set error 812 can sometimes be improved, such as to be more rigorous. Sometimes, the first or second point set error 812 can be in a form that is not digestible by the bundle adjustment operation 818. The point set error 812 can be conditioned by a condition point set error operation 814 to generate an error matrix 816. The condition point set error operation 814 can include generating a covariance matrix 816 of error parameters of the first 3D point set 102A or the second 3D point set 102B. The error parameters can include seven parameters. Three of the parameters can include translation in x, y, and z, respectively. Three of the parameters can be for rotation in x, y, and z (roll, pitch, and yaw), respectively. One of the parameters can be for a scale factor between the first 3D point set 102A and the second 3D point set 102B. An example of the matrix 816 produced by the condition point set error operation 814 is provided as $$\begin{bmatrix} \bar{x} & \bar{x}\bar{y} & \bar{x}\bar{z} & \bar{x}\omega & \bar{x}\varphi & \bar{x}\kappa & \bar{x}s \\ \bar{y}\bar{x} & \bar{y} & \bar{y}\bar{z} & \bar{y}\omega & \bar{y}\varphi & \bar{y}\kappa & \bar{y}s \\ \bar{z}\bar{x} & \bar{z}\bar{y} & \bar{z} & \bar{z}\omega & \bar{z}\varphi & \bar{z}\kappa & \bar{z}s \\ \omega\bar{x} & \omega\bar{y} & \omega\bar{z} & \omega & \omega\varphi & \omega\kappa & \omega s \\ \varphi\bar{x} & \varphi\bar{y} & \varphi\bar{z} & \varphi\omega & \varphi & \varphi\kappa & \varphi s \\ \kappa\bar{x} & \kappa\bar{y} & \kappa\bar{z} & \kappa\omega & \kappa\varphi & \kappa & \kappa s \\ s\bar{x} & s\bar{y} & s\bar{z} & s\omega & s\varphi & s\kappa & s \end{bmatrix}$$

where $\bar{x}$ is translation in x, $\bar{y}$ is translation in y, where $\bar{z}$ is translation in z, $\omega$ is roll, $\rho$ is pitch, $\kappa$ is yaw, and s is scale.

The bundle adjustment operation 818 can receive the tie points 808, tie point error 810, first 3D point set 102A, second 3D point set 102B, and the error matrix 816 at input. The bundle adjustment operation 818 can produce a merged 3D point set 128 and a merged 3D point set error 822 as output. The bundle adjustment operation 818 can use a least squares estimator (LSE) for registration of the first 3D point set 102A and the second 3D point set 102B. The operation 818 is easily extendable to merging more than two 3D data sets even though the description regards only two 3D data sets at times. The bundle adjustment operation 818 can use one or more photogrammetric techniques. The bundle adjustment operation 818 can include outlier rejection. The bundle adjustment operation 818 can determine error model parameters for the 3D data sets. Application of the error model parameters to the first 3D point set 102A and the second 3D point set 102B, results in the relative alignment (registration) of the first 3D point set 102A and the second 3D point set 102B.

A reference number with a letter suffix is a specific instance of the general item without the letter suffix. For example, the 3D point set 102A is a specific instance of the general 3D point set 102.

FIG. 9 illustrates an example diagram of an embodiment of the relationship between ground point coordinate estimates $\hat{V}_j$ and the corresponding 3D data set observations $\tilde{V}_{ij}$. In FIG. 9, three misregistered 3D data sets 902, 904, and 906 and a reference frame 924 are illustrated. First image observations 908, 910, 912 and a first associated ground point 914 and second image observations 916, 918, 920, and a second associated ground point 922 are illustrated. The ground point 914 can be determined using a least squares estimator. The least squares estimator can reduce (e.g., minimize) the discrepancy (across all observations and ground points) across all images. The least squares estimator can project an error in one or more of the 3D data sets to an error in a registered 3D data set.

This section establishes some preliminary notational conventions and symbol definitions used for developing the formulations for the bundle adjustment operation 818. The bundle adjustment operation 818 can include identifying a ground point that reduces a discrepancy between the ground point and corresponding points in respective images, and then adjusting points in the 3D data sets in a manner that reduces the discrepancy. The term "3D data set" is sometimes referred to as an "image". For convenience, example sizes of vectors and matrices are indicated below the symbol in red. Thus, the symbol $$\underset{N \times M}{A}$$

denotes a matrix A with N rows and M columns. Column vectors from $R^3$ thus have the annotation 3×1. Components of a vector V are written as $$\underset{3 \times 1}{V} = [x \ y \ z]^T.$$

If the vector includes diacritical marks or distinguishing embellishments, these are transferred to the components, as in $\bar{V}=[\bar{x} \ \bar{y} \ \bar{z}]^T$ and $V'=[x' \ y' \ z']^T$.

Equation modeling of the relationship between points in one 3D space to corresponding points in another 3D space is now described. A common reference space is established across all of the images. The reference space can be constructed to accommodate a simultaneous adjustment of more than two images. Correspondences can be formed between points in the reference space and the measured conjugate point locations in each image. The observation equation can be represented as Equation 1:

$$\underset{3\times1}{\tilde{V}} = (1+s) \underset{3\times3}{T} \left( \underset{3\times1}{\hat{V}} - \underset{3\times1}{\overline{V}} \right) \qquad \text{Equation 1}$$

where $\hat{V}$ is a reference-space 3D coordinate, $\tilde{V}$ is the observation of $\hat{V}$ in an image and the orientation and offset relationship between reference space and image space is taken from the orientation matrix $\overline{T}$ and offset vector using Equation 2:

$$T \equiv T(\omega, \phi, \kappa) = \qquad \text{Equation 2}$$

$$\begin{bmatrix} c\phi c\kappa & c\omega s\kappa + s\omega s\phi c\kappa & s\omega s\kappa - c\omega s\phi c\kappa \\ -c\phi s\kappa & c\omega c\kappa - s\omega s\phi s\kappa & s\omega c\kappa + c\omega s\phi s\kappa \\ s\phi & -s\omega c\phi & c\omega c\phi \end{bmatrix}$$

where the symbols "c" and "s" denote trigonometric cosine and sine functions, respectively. The quantities $$\underset{3\times1}{\theta} \equiv [\omega \ \phi \ \kappa]^T$$

refer to rotation angles (roll, pitch and yaw) about an image's x, y, and z axes respectively. The scalar s represents an isometric scale correction factor (nominally zero). The above form is conducive to modeling a simultaneous least squares adjustment of all images' offsets and orientations, provided that estimates of reference space coordinates for all conjugate image observations vectors are available. This form is more suitable and flexible than explicitly holding a single image as a reference for at least one of several reasons: (1) there are reference space ground coordinates that permit the potential use of ground control points, whose a priori covariances are relatively small (e.g., they carry high weighting in the solution); (2) the above formulation is suitable for a simultaneous adjustment for data that includes small or minimal overlap (mosaics), as well as, many images collected over the same area (stares) or any combination in between; and (3) a single image can effectively (e.g., implicitly) be held as a reference by appropriate a priori weighting of its error model parameters.

The symbol $\hat{V}$ will be referred to as a ground point (akin to tie point ground locations and ground control point locations in a classical photogrammetric image adjustment). The symbol $\tilde{V}$ will be referred to as a ground point observation (akin to image tie point observation locations in a classical photogrammetric image adjustment).

Unlike the classical photogrammetric treatment, $\hat{V}$ and $\tilde{V}$ are both "on the ground" in the sense that they both represent ground coordinates in 3D (in the classical imagery case, the observations are in image space and are thus 2D coordinates). Further, the point may very well not be "on the ground" but could be on a building rooftop, treetop canopy, etc. However, the terminology "ground point" and "ground point observation" will be used.

If j is taken to be the index of an arbitrary ground point and i to be the index of an arbitrary image, the observation equation (Equation 1) can be written as Equation 3

$$\tilde{V}_{ij} = (1+s_i)T_i(\hat{V}_j - \overline{V}_i) \quad \text{Equation 3}$$

where $\hat{V}_j \equiv [\hat{x}_j \ \hat{y}_j \ \hat{z}_j]^T$ as the $j^{th}$ ground point, $\overline{V}_i \equiv [\overline{x}_i \ \overline{y}_i \ \overline{z}_i]^T$ as the offset vector between image i and the reference space origin, and where $$T_i \equiv T(\omega_i, \phi_i, \kappa_i) =$$
$$\begin{bmatrix} c\phi_i c\kappa_i & c\omega_i s\kappa_i + s\omega_i s\phi_i c\kappa_i & s\omega_i s\kappa_i - c\omega_i s\phi_i c\kappa_i \\ -c\phi_i s\kappa_i & c\omega_i c\kappa_i - s\omega_i s\phi_i s\kappa_i & s\omega_i c\kappa_i + c\omega_i s\phi_i s\kappa_i \\ s\phi_i & -s\omega_i c\phi_i & c\omega_i c\phi_i \end{bmatrix} \quad \text{Equation 4}$$

is the orientation matrix between image i and the reference space frame and where $s_i$ is image i scale correction factor. Thus, $\tilde{V}_{ij}$ is the coordinate of the $i^{th}$ image's observation of ground point j.

If a particular ground point is found in two or more images, it can serve as a point which ties the images together (one of the tie points 808). These are generically referred to as tie points (or tie points). A single tie point is often referred to as a collection of image observations (with coordinates) of the same point on the ground along with the corresponding ground point (with coordinates).

Since the observations over many images i are the measurements containing error, the true ground point coordinates are generally unknown. To facilitate this, an initial estimate of the ground point location can be computed. The initial estimate is provided as Equation 5

$$\hat{V}_j^{(0)} \equiv \frac{1}{|I_j|} \sum_{i \in I_j} \tilde{V}_{ij}^R \quad \text{Equation 5}$$

The ground points themselves are treated as derived (but unconstrained) observations and allowed to adjust in performance of the operation 818. There can be an observation of interest whose true ground coordinates are well known. These are classically called ground control points (or GCPs). Since this development can accommodate both GCPs and tie points, the more general terms of "ground point" and "ground point observation" are sometimes used (as contrasted with "tie point ground coordinate" and "tie point observation").

The bundle adjustment operation 818 can operate on two or more images taken over a same area (with observations for tie points, sometimes called a stare scenario); two or more images taken in strips (forming a mosaic of data, with 2-way, 3-way, or m-way observations in strip overlap regions); tie points in which the corresponding ground points may appear in two or more images, incorporation of GCPs for features in imagery, providing an absolute registration; accommodation of a full covariance for tie point observations. This is conducive for tie point correlation techniques which are highly asymmetrical (e.g., as long as the asymmetry can be characterized as a measurement covariance).

The relationship between ground point coordinate estimates $\hat{V}_j$ and the corresponding image observations $\tilde{V}_{ij}$ can be understood as a stare scenario between three misregistered images.

For the development of the LSE formulation (and associated preprocessing) that can be performed by the bundle adjustment operation 118, more definitions are provided in Table 1.

TABLE 1

Definitions of Symbols

| Symbol | Definition |
|---|---|
| $V_R^W$ <br> $3 \times 1$ | Location of the origin of the reference frame with respect to the world frame. This is thus the location of the reference frame coordinatized in the world-frame. |
| $\overline{V}_i$ <br> $3 \times 1$ | Translation of $i^{th}$ image with respect to reference frame origin. $\overline{V}_i \equiv [\overline{x}_i \ \overline{y}_i \ \overline{z}_i]^T$ |
| $\theta_i$ <br> $3 \times 1$ | Orientation angles of $i^{th}$ image with respect to image frame origin $\theta_i \equiv [\omega_i \ \phi_i \ \kappa_i]^T$ |
| $s_i$ <br> $1 \times 1$ | Isometric scale factor correction for the $i^{th}$ image. |
| $\overline{V}_i^{(0)}$ <br> $3 \times 1$ | Initial (zeroth-iteration) value for $\overline{V}_i$, thus assumed to be with respect to reference frame origin. |
| $\theta_i^{(0)}$ <br> $3 \times 1$ | Initial (zeroth-iteration) value for $\theta_i$. Each element is taken to be zero. |
| $s_i^{(0)}$ <br> $1 \times 1$ | Initial (zeroth iteration) value for $s_i$. Nominally $s_i^{(0)} \equiv 0$. |
| $T_i$ <br> $3 \times 3$ | Orientation matrix for $i^{th}$ image built from $\theta_i$ |
| $\hat{V}_j$ <br> $3 \times 1$ | Ground point coordinates for ground point j with respect to the reference frame origin $\hat{V}_j \equiv [\hat{x}_j \ \hat{y}_j \ \hat{z}_j]^T$ |
| $\hat{V}_j^{(0)}$ <br> $3 \times 1$ | Initial (zeroth-iteration) estimated value for $\hat{V}_j$ |
| $\tilde{V}_{ij}^W$ <br> $3 \times 1$ | Ground point observation coordinate of ground point j on image i coordinatized in the world frame (e.g., these are UTM coordinates of the ground point observation location). |
| $\tilde{V}_{ij}$ <br> $3 \times 1$ | Ground point observation coordinate of ground point j on image i. These are implicitly assumed to be coordinatized in the local image frame for image i. $\tilde{V}_{ij} \equiv [\tilde{x}_{ij} \ \tilde{y}_{ij} \ \tilde{z}_{ij}]^T$ |
| $\Sigma_i$ <br> $7 \times 7$ | A priori covariance of $i^{th}$ image translation, orientation and scale correction parameter vector |
| $W_i$ <br> $7 \times 7$ | A priori parameter weight matrix for image i. <br> $W_i = \Sigma_i^{-1}$ |
| $\Sigma_j$ <br> $3 \times 3$ | A priori covariance of ground point j |
| $W_j$ <br> $3 \times 3$ | A priori weight matrix for ground point j. <br> $W_j = \Sigma_j^{-1}$ |

TABLE 1-continued

Definitions of Symbols

| Symbol | Definition |
|---|---|
| $\tilde{\Sigma}_{ij}$ <br> $3\times3$ | A priori covariance for observation of ground point j upon image i |
| $\tilde{W}_{ij}$ <br> $3\times3$ | A priori observation weight matrix for observation of ground point j upon image i. $\tilde{W}_{ij} = (\tilde{\Sigma}_{ij})^{-1}$ |

General Indexing

| | |
|---|---|
| m | Number of images |
| i | Image index. $i \in \{1, 2 \ldots, m\}$ |
| n | Total number of ground points |
| j | Ground point index $j \in \{1, 2 \ldots, n\}$ |
| q | Total number of ground point observations |
| b | Ground point observation index $b \in \{1, 2 \ldots, q\}$ |
| (p) | Non-linear least squares iteration index |
| $G_i$ | The index set of all ground points appearing in image i. Thus $G_i \subseteq \{1, 2 \ldots, n\}$ |
| $0_j$ | The index set of observations of ground point j over all images. Thus $0_j \subseteq \{1, 2 \ldots, q\}$ |
| $I_j$ | The index set of images upon which ground point j is an observation. Thus $Ij \subseteq \{1, 2 \ldots, m\}$ |
| $M_b^G$ | Mapping of observation index to Ground point index. $M_b^G$ gives the ground point index ($\in \{1, 2, \ldots, n\}$) for a specified observation index $b \in \{1, 2 \ldots, q\}$. |
| |S| | Cardinality of set S (e.g., the number of index elements in set S). |

Ground point observations can be indexed by ground point j and image i (as in $\tilde{V}_{ij}$) or by linear indexing, b (as in $\tilde{V}_b$). Use of the subscripting depends upon the context. In the former, it is of interest to characterize the fact that a particular ground point j appears on a particular image i. In the latter, it is of interest to enumerate all observations independent of to which image or to which ground point they refer.

Since some 3D point set data is presented in a "world" space coordinate system (e.g., Universal Transverse Mercator (UTM) map projection) and since the observation Equation 3 is image dependent, some coordinate frame definitions and transformations can aid understanding.

If it is assumed that ground point observation locations are specified in world coordinates, it is of interest to transform the ground point observation locations to be "image" relative. Further, it can be of interest to obtain the ground locations and image offsets themselves to be relative to a "local" reference coordinate frame.

A motivation for a local reference coordinate frame can be to remove large values from the coordinates. For example, UTM coordinates can typically be in the hundreds of thousands of meters. This makes interpretation of the coordinates more difficult, for example, when examining a report of updated coordinate locations. A motivation for an image-relative coordinate frame can be so that the interpretation of the orientation angles comprising the $T_i$ matrices can be relative to the center of the data set. This is contrasted with the origin of rotation being far removed from the data set (e.g., coincident with the local reference frame origin in the mosaic scenario).

In both cases, the transformations between coordinate frames simply involve a 3D translation. The mnemonics W, R and I are used to denote the "world", "reference" and "image" coordinate frames, respectively. To facilitate the transformations, the following convention is established. A superscript on a vector denotes the coordinate frame to which it is referred. Thus $\tilde{V}_{ij}^W$ corresponds to the world space coordinates of a particular tie point observation, while $\tilde{V}_{ij}^R$ and $\tilde{V}_{ij}^I$ represent the same tie point observation but referred to the reference frame and image frame, respectively.

Following the above convention, the symbol can $V_A^B$ represent "the location of the origin of frame A coordinatized in frame B". Thus, $V_R^W$ can represent the location of the reference frame in the world coordinate system (e.g., UTM coordinates of the origin of the reference frame). The relationship between an arbitrary vector $V^R$ coordinatized in the reference frame and the same vector $V^W$ coordinatized in the world frame can be represented by Equation 6

$$V^W = V^R + V_R^W \qquad \text{Equation 6}$$

The reference frame can be established as an average of all of the world-space coordinates of tie points. This offset (denoted $V_R^W$) can be determined using Equation $$V_R^W = \frac{1}{q}\sum_{b=1}^{q} \tilde{V}_b^W \qquad \text{Equation 7}$$

For simplicity, it can be assumed that the reference frame origin, referred to by the world frame, can be computed by a process external to the bundle adjustment operation 818 (e.g., by the process that assembles the tie points 808 for use in the bundle adjustment operation 818).

The image frame (e.g., a frame defined on a per-image basis) can be the world coordinates of the center of an image. Under the assumption that there are bounding coordinates in the image data (specifying the min and max extents of the data in world-frame X, Y and Z), the center of the data can thus be taken to be the respective averages of the min and max extents. Since this image frame refers to world space, the computed offset is denoted $V_I^W$. If bounding coordinates are not available, value for $V_I^W$ is taken as the average of the tie point locations over the specific image i, as described in Equation 8

$$V_I^W = \frac{1}{|G_i|}\sum_{j \in G_i} \tilde{V}_{ij} \qquad \text{Equation 8}$$

The image frame offset in reference space coordinates is taken to be the initial value for $\overline{V}^{(O)}$ on a per image basis. Thus, for each image i, an external process can compute reference frame coordinates according to Equation 9

$$\overline{V}_I^{(O)R} = V_I^W - V_R^W \qquad \text{Equation 9}$$

Since the tie point observation values can be input in world coordinates and since the observation equation domain assumes reference frame coordinates, some preprocessing of the input data can help make it consistent with that assumed by the observation equation (Equations 1 or 3). The tie point observation coordinates can be converted from world space to reference space. This can be performed for each observation per Equation 10.

$$\tilde{V}_{ij}^R = \tilde{V}_{ij}^W - V_R^W \qquad \text{Equation 10}$$

Next, since the true ground point coordinates used in Equation 3 can be unknown, they can be estimated. The ground point coordinates can be assumed to be coordinatized in the reference frame. The initial estimated values for the ground coordinates of each tie point can be computed as an average of the ground point observations over all images in which it appears as described b Equation 11

$$\hat{V}_j^{(0)} \equiv \frac{1}{|I_j|} \sum_{i \in I_j} \tilde{V}_{ij}^R \qquad \text{Equation 11}$$

Since the true locations of the tie point ground coordinates can be treated as unknown, the a priori covariance can reflect this by treating the errors in the ground coordinates as numerically unconstrained (in units of meters squared) as described by Equation 12

$$\hat{\Sigma}_j = \text{diag}([10^{12} 10^{12} 10^{12}]) \qquad \text{Equation 12}$$

The tie point observation coordinates for use in the observation equation can be converted to image-relative coordinates using Equation 13.

$$\tilde{V}_{ij} = \tilde{V}_{ij}^R - \overline{V}_i^{(0)} \qquad \text{Equation 13}$$

Next, a least squares formulation and solution are discussed. Since the observation equation, Equation 1 or 3, is non-linear in the orientation angles that form $T_i$, the least squares problem becomes a non-linear least squares problem. Equation 3 can be linearized. Solving the linearized equation can be a multidimensional root finding problem (in which the root is the vector of solution parameters).

For simplification in notation of the linearization, consider a fixed image and a fixed ground point. Let the unknown error model parameters (offset, orientation, and scale correction) be represented by Equation 14:

$$\underset{7 \times 1}{X} \equiv [\overline{x} \ \overline{y} \ \overline{z} \ \omega \ \varphi \ \kappa_S]^T \qquad \text{Equation 14}$$

The observation equation for ground point observation $\tilde{V}$ can be written as Equation 15

$$\tilde{V} = (1+s)T(\hat{V} - \overline{V}) \qquad \text{Equation 15}$$

where T is the true image orientation matrix, $\overline{V}$ is the true image translation vector, $\hat{V}$ is the true ground point coordinate and $\tilde{V}$ is the corresponding ground point observation coordinate.

If one wishes to include the ground point coordinates $\hat{V}$ as additional observations, the solution for X and $\hat{V}$ can be cast as a root solving problem based on Equation 16

$$F(X; \hat{V}) = 0 \qquad \text{Equation 16}$$

where $$F(X; \hat{V}) = \tilde{V} - (1+s)T(\hat{V} - \overline{V}) \qquad \text{Equation 17}$$

In vector form, the function, F, can be represented by Equation 18

$$\begin{bmatrix} f_1 \\ f_2 \\ f_3 \end{bmatrix} = \begin{bmatrix} \tilde{x} \\ \tilde{y} \\ \tilde{z} \end{bmatrix} - (1+s)T \left( \begin{bmatrix} \hat{x} \\ \hat{y} \\ \hat{z} \end{bmatrix} - \begin{bmatrix} \overline{x} \\ \overline{y} \\ \overline{z} \end{bmatrix} \right) \qquad \text{Equation 18}$$

The function F can be approximated using a first-order Taylor series expansion of F about initial estimates $X^{(0)}$ and $\hat{V}^{(0)}$ as in Equation 19

$$0 = F(X; \hat{V}) \approx F(X^{(0)}; \hat{V}^{(0)}) + \frac{\partial F^{(0)}}{\partial X} \dot{\Delta} + \frac{\partial F^{(0)}}{\partial \hat{V}} \ddot{\Delta} \qquad \text{Equation 19}$$

where $X^{(0)}$ is an initial approximation of X, $\hat{V}^{(0)}$ is an initial approximation of $\hat{V}$, the Jacobians $$\frac{\partial F^{(0)}}{\partial X} \text{ and } \frac{\partial F^{(0)}}{\partial \hat{V}}$$

and are the partial derivatives of F evaluated at $X^{(0)}$ and $\hat{V}^{(0)}$ respectively, $\dot{\Delta} \equiv [\Delta \overline{x} \ \Delta \overline{y} \ \Delta \overline{z} \ \Delta \omega \ \Delta \varphi \ \Delta \kappa \ \Delta s]^T$ is a vector of corrections to X, $\hat{\Delta} \equiv [\Delta \hat{x} \ \Delta \hat{y} \ \Delta \hat{z}]$ is a vector of corrections to $\hat{V}$. The values for $X^{(0)}$ and $\hat{V}^{(0)}$ are discussed in Table 4 and in sections 3.3.2 and 3.3.3.

The Jacobians can be written as Equations 20 and 21

$$\underset{3 \times 7}{\dot{B}} \equiv \qquad \text{Equation 20}$$

$$\frac{\partial F}{\partial X} = \begin{bmatrix} \frac{\partial f_1}{\partial X} \\ \frac{\partial f_2}{\partial X} \\ \frac{\partial f_3}{\partial X} \end{bmatrix} = \begin{bmatrix} \frac{\partial f_1}{\partial \overline{x}} & \frac{\partial f_1}{\partial \overline{y}} & \frac{\partial f_1}{\partial \overline{z}} & \frac{\partial f_1}{\partial \omega} & \frac{\partial f_1}{\partial \varphi} & \frac{\partial f_1}{\partial \kappa} & \frac{\partial f_1}{\partial s} \\ \frac{\partial f_2}{\partial \overline{x}} & \frac{\partial f_2}{\partial \overline{y}} & \frac{\partial f_2}{\partial \overline{z}} & \frac{\partial f_2}{\partial \omega} & \frac{\partial f_2}{\partial \varphi} & \frac{\partial f_2}{\partial \kappa} & \frac{\partial f_2}{\partial s} \\ \frac{\partial f_3}{\partial \overline{x}} & \frac{\partial f_3}{\partial \overline{y}} & \frac{\partial f_3}{\partial \overline{z}} & \frac{\partial f_3}{\partial \omega} & \frac{\partial f_3}{\partial \varphi} & \frac{\partial f_3}{\partial \kappa} & \frac{\partial f_3}{\partial s} \end{bmatrix}$$

$$\underset{3 \times 3}{\ddot{B}} \equiv \frac{\partial F}{\partial \hat{V}} = \begin{bmatrix} \frac{\partial f_1}{\partial \hat{V}} \\ \frac{\partial f_2}{\partial \hat{V}} \\ \frac{\partial f_3}{\partial \hat{V}} \end{bmatrix} = \begin{bmatrix} \frac{\partial f_1}{\partial \hat{x}} & \frac{\partial f_1}{\partial \hat{y}} & \frac{\partial f_1}{\partial \hat{z}} \\ \frac{\partial f_2}{\partial \hat{x}} & \frac{\partial f_2}{\partial \hat{y}} & \frac{\partial f_2}{\partial \hat{z}} \\ \frac{\partial f_3}{\partial \hat{x}} & \frac{\partial f_3}{\partial \hat{y}} & \frac{\partial f_3}{\partial \hat{z}} \end{bmatrix} \qquad \text{Equation 21}$$

Note that the dot symbols are merely notations, following the classical photogrammetric equivalent, and do not intrinsically indicate "rates," as is sometimes denoted in other classical physics contexts.

In matrix notation, Equation 19 can be written as $$\begin{bmatrix} \frac{\partial F^{(0)}}{\partial X} & \frac{\partial F^{(0)}}{\partial \hat{V}} \end{bmatrix} \begin{bmatrix} \dot{\Delta} \\ \ddot{\Delta} \end{bmatrix} = -F(X^{(0)}; \hat{V}^{(0)}) \qquad \text{Equation 22}$$

or $$\begin{bmatrix} \underset{3 \times 7}{\dot{B}} & \underset{3 \times 7}{\ddot{B}} \end{bmatrix} \begin{bmatrix} \underset{3 \times 1}{\dot{\Delta}} \\ \underset{3 \times 1}{\ddot{\Delta}} \end{bmatrix} = \underset{3 \times 1}{\varepsilon} \qquad \text{Equation 23}$$

Since the problem is nonlinear, the estimation of the parameter vector can be iterated (via a multi-dimensional extension of the Newton-Raphson method for root finding, or other technique). The solution can include re-linearization at each iteration. The re-linearization can be performed about the most recent estimate of the parameter vector. The linearized form of Equation 22 at iteration (p) can be represented as in Equation 24.

$$F(X; V) \approx F(X^{(p)}; \hat{V}^{(p)}) + \frac{\partial F^{(p)}}{\partial X} \dot{\Delta} + \frac{\partial F^{(p)}}{\partial \hat{V}} \ddot{\Delta} \qquad \text{Equation 24}$$

where $X^{(p)}$ is the p iteration estimate of the parameter vector X, $\hat{V}^{(p)}$ is the $p^{th}$ iteration estimate of $\hat{V}$, $$\frac{\partial F^{(p)}}{\partial X}$$

is the Jacobian of F with respect to X evaluated at $X^{(p)}$, $$\frac{\partial F^{(p)}}{\partial \hat{V}}$$

is the Jacobian of F with respect to $\hat{V}$ evaluated at $\hat{V}^{(p)}$, $\dot{\Delta}$ is a vector of corrections to X for the $p^{th}$ iteration, and $\ddot{\Delta}$ is a vector of corrections to $\hat{V}$ for the $p^{th}$ iteration.

With each iteration, the parameter and ground point vectors can be updated with the most recent correction as in Equations 25 and 26.

$$X^{(p)} = X^{(p-1)} + \dot{\Delta} \qquad \text{Equation 25}$$

$$\hat{V}^{(p)} = \hat{V}^{(p-1)} + \ddot{\Delta} \qquad \text{Equation 26}$$

For the initial iteration, initial values for $X^{(0)}$ and $\hat{V}^{(0)}$ can be estimated as discussed previously. The system represented by Equation 24 is now linear in $\dot{\Delta}$ and $\ddot{\Delta}$. A linear solver can be used to solve for the parameters.

For a particular image i and a particular ground point j, Equation 23 can be written as Equation 27

$$\begin{bmatrix} \dot{B}_{ij} & \ddot{B}_{ij} \\ 3\times 7 & 3\times 3 \end{bmatrix} \begin{bmatrix} \dot{\Delta}_i \\ 7\times 1 \\ \ddot{\Delta}_j \\ 3\times 1 \end{bmatrix} = \varepsilon_{ij} \atop 3\times 1 \qquad \text{Equation 27}$$

The discrepancy vector for the $p^{th}$ iteration is thus be represented as in Equation 28

$$\varepsilon_{ij}^{(p)} = -F(X^{(p)}; \hat{V}^{(p)}) \qquad \text{Equation 28}$$

and thus $$\varepsilon_{ij}^{(p)} = -[\hat{V}_{ij} - (1+s_i)T_i(\hat{V}_j - \overline{V}_i)] \qquad \text{Equation 29}$$

To accommodate a simultaneous solution of all images and ground points, Equation 27 can be extended as $$\begin{bmatrix} \dot{B}_{11} & 0 & \cdots & 0 & \ddot{B}_{11} & 0 & \cdots & 0 \\ \dot{B}_{12} & 0 & \cdots & 0 & 0 & \ddot{B}_{12} & \cdots & 0 \\ \vdots & \vdots & \vdots & 0 & \vdots & \vdots & \ddots & 0 \\ 0 & \dot{B}_{21} & \cdots & 0 & \ddot{B}_{21} & 0 & \vdots & 0 \\ \vdots & \vdots & \vdots & 0 & \vdots & \vdots & \vdots & \vdots \\ 0 & 0 & \cdots & \dot{B}_{mn} & 0 & 0 & \cdots & \ddot{B}_{mn} \end{bmatrix} \begin{bmatrix} \dot{\Delta}_1 \\ \dot{\Delta}_2 \\ \vdots \\ \dot{\Delta}_m \\ \ddot{\Delta}_1 \\ \ddot{\Delta}_2 \\ \vdots \\ \ddot{\Delta}_n \end{bmatrix} = \begin{bmatrix} \varepsilon_{11} \\ \varepsilon_{12} \\ \vdots \\ \varepsilon_{21} \\ \vdots \\ \varepsilon_{mn} \end{bmatrix} \qquad \text{Equation 30}$$

Equation 30 can be re-written as Equation 31

$$B\Delta = E \qquad \text{Equation 31}$$

then the normal equation matrix can be represented as Equation 32 or Equation 33

$$(B^T B)\Delta = B^T E \qquad \text{Equation 32}$$

$$Z\Delta = H \qquad \text{Equation 33}$$

It can be less efficient to form B as in Equation 30, for one or more of the following reasons: (1) B is very sparse; (2) the quantities $\dot{B}_{ij}$ and $\ddot{B}_{ij}$ are nonzero if and only if ground point j is observed on image i. For this reason, the classical development of the normal matrix $B^T B$ and right-hand side vector $B^T E$ uses summations over the appropriate indexing. These summations are provided in the normal matrix partitioning below.

The foregoing equations form a foundation for the present problem that is sufficient for development of the normal equations, examination of the normal matrix structure and formulation of the normal equation solution.

The normal equation can be written as in Equation 34

$$Z\Delta = H \qquad \text{Equation 34}$$

The matrices can be partitioned as in Equations 35-37

$$Z = \begin{bmatrix} \dot{N} + \dot{W} & \overline{N} \\ \overline{N}^T & \ddot{N} + \ddot{W} \end{bmatrix} \qquad \text{Equation 35}$$

$$\Delta = \begin{bmatrix} \dot{\Delta} \\ \ddot{\Delta} \end{bmatrix} \qquad \text{Equation 36}$$

$$H = \begin{bmatrix} \dot{K} \\ \ddot{K} \end{bmatrix} = \begin{bmatrix} \dot{W}\dot{C} \\ \ddot{W}\ddot{C} \end{bmatrix} \qquad \text{Equation 37}$$

The quantities $\dot{K}$, $\ddot{K}$, $\dot{C}$ and $\ddot{C}$ are described in more details elsewhere herein.

Combining Equations 35, 36 and 37 yields Equation 38

$$\begin{bmatrix} \dot{N} + \dot{W} & \overline{N} \\ \overline{N}^T & \ddot{N} + \ddot{W} \end{bmatrix} \begin{bmatrix} \dot{\Delta} \\ \ddot{\Delta} \end{bmatrix} = \begin{bmatrix} \dot{K} \\ \ddot{K} \end{bmatrix} - \begin{bmatrix} \dot{W}\dot{C} \\ \ddot{W}\ddot{C} \end{bmatrix} \qquad \text{Equation 38}$$

The matrix Z can thus be represented as Equation 39

$$Z = N + W = \begin{bmatrix} \dot{N} & \overline{N} \\ 7m\times 7m & 7m\times 3n \\ \overline{N}^T & \ddot{N} \\ 3n\times 6m & 3n\times 3n \end{bmatrix} + \begin{bmatrix} \dot{W} & 0 \\ 7m\times 7m & \\ 0 & \ddot{W} \\ & 3n\times 3n \end{bmatrix} \qquad \text{Equation 39}$$

The matrix $\dot{N}$ can be written as Equation 40

$$\dot{N}_{7m\times 7m} = \begin{bmatrix} \dot{N}_1 & 0 & \cdots & 0 \\ 7\times 7 & & & \\ 0 & \dot{N}_2 & \cdots & 0 \\ & 7\times 7 & & \\ \vdots & \vdots & \ddots & \vdots \\ 0 & 0 & \cdots & \dot{N}_m \\ & & & 7\times 7 \end{bmatrix} \qquad \text{Equation 40}$$

and analogously $\dot{W}$ can be written as Equation 41

$$\dot{W}_{7m\times 7m} = \begin{bmatrix} \dot{W}_1 & 0 & \cdots & 0 \\ 7\times 7 & & & \\ 0 & \dot{W}_2 & \cdots & 0 \\ & 7\times 7 & & \\ \vdots & \vdots & \ddots & \vdots \\ 0 & 0 & \cdots & \dot{W}_m \\ & & & 7\times 7 \end{bmatrix} \qquad \text{Equation 41}$$

The block entries of $\dot{N}_i$ can be defined as in Equation 42

$$\dot{N}_i_{7\times 7} = \sum_{j\in G_i} \dot{B}_{ij}^T \dot{W}_{ij} \dot{B}_{ij}$$

Equation 42

The subscripts ij on the $\dot{B}_{ij}$ matrices indicate that they are a function of image i and ground point j.

The matrix N can be expanded as in Equation 43

$$\ddot{N}_{3n\times 3n} = \begin{bmatrix} \ddot{N}_1_{3\times 3} & \square & \cdots & 0 \\ 0 & \square & \cdots & 0 \\ \vdots & \vdots & \ddots & \vdots \\ 0 & 0 & \cdots & \ddot{N}_n_{3\times 3} \end{bmatrix}$$

Equation 43

$\ddot{W}$ can be expanded as in Equation 44:

$$\ddot{W}_{3n\times 3n} = \begin{bmatrix} \ddot{W}_1_{3\times 3} & 0 & \cdots & 0 \\ 0 & \ddot{W}_2_{3\times 3} & \cdots & 0 \\ \vdots & \vdots & \ddots & \vdots \\ 0 & 0 & \cdots & \ddot{W}_n_{3\times 3} \end{bmatrix}$$

Equation 44

The block entries of Equation 43 can be defined as in Equation 45

$$\ddot{N}_j_{3\times 3} = \sum_{i\in O_j} \ddot{B}_{ij}^T \ddot{W}_{ij} \ddot{B}_{ij}$$

Equation 45

The matrix N from Equation 39 can be expanded as in Equation 46

$$\overline{N}_{7m\times 3n} \equiv \begin{bmatrix} \overline{N}_{11}_{7\times 3} & \overline{N}_{12}_{7\times 3} & \cdots & \overline{N}_{1n}_{7\times 3} \\ \overline{N}_{21}_{7\times 3} & \overline{N}_{22}_{7\times 3} & \cdots & \overline{N}_{2n}_{7\times 3} \\ \vdots & \vdots & \ddots & \vdots \\ \overline{N}_{m1}_{7\times 3} & \overline{N}_{m2}_{7\times 3} & \cdots & \overline{N}_{mn}_{7\times 3} \end{bmatrix}$$

Equation 46

The block entries of $\overline{N}$ from Equation 45 can be defined as in Equation 47

$$\overline{N}_{ij}_{7\times 3} = \dot{B}_{ij}^T \dot{W}_{ij} \ddot{B}_{ij}\, i \in \{1, \ldots, m\}, j \in \{1, \ldots, n\}$$

Equation 47

In a similar development the right hand side matrix H from Equation 34 can be expanded as in Equation 48

$$H = \begin{bmatrix} \dot{K}_1 \\ \dot{K}_2 \\ \vdots \\ \dot{K}_m \\ \ddot{K}_1 \\ \ddot{K}_2 \\ \vdots \\ \ddot{K}_n \end{bmatrix} - \begin{bmatrix} \dot{W} & 0 \\ 0 & \ddot{W} \end{bmatrix} \begin{bmatrix} \dot{C} \\ \ddot{C} \end{bmatrix}$$

Equation 48

The subblocks of H can be defined as in Equations 49 and 50

$$\dot{K}_i_{7\times 1} = \sum_{j\in G_i} \dot{B}_{ij}^T \dot{W}_{ij}\varepsilon_{ij}$$

Equation 49

$$\ddot{K}_j_{3\times 1} = \sum_{i\in O_j} \ddot{B}_{ij}^T \ddot{W}_{ij}\varepsilon_{ij}$$

Equation 50 with the discrepancy vector $\varepsilon_{ij}$ defined as in Equation 29.

$$\dot{C}^{(p)} = \dot{C}^{(p-1)} - \dot{C}^{(0)}$$

Equation 51

$$\ddot{C}^{(p)} = \ddot{C}^{(p-1)} - \ddot{C}^{(0)}$$

Equation 52

The values for $\dot{C}^{(0)}$ and $\ddot{C}^{(0)}$ are the initial parameter values. The initial values for the translation parameters portion of $\dot{C}^{(0)}$ can be taken to be the $\nabla_i^{(0)^R}$ as computed in Equation 9. The initial values for the rotation parameters portion of 60) can be taken to be zero.

The initial values of $\ddot{C}^{(0)}$ can be taken to be the values of the ground point coordinates $\hat{V}_j^{(0)}$ as computed in accord with Equation 11.

The solution to the normal equation matrix on iteration (p) can be determined as in Equation 53

$$\Delta^{(p)} = Z^{-1} H$$

Equation 53

At each iteration, the parameters can be updated via Equations 51 and Equation 52 and the normal matrix can be formed and solved again. The process can continue until the solution converges. Examples of the convergence criterion can be discussed in the following section.

Since the solution is iterated, a convergence criterion can be established. An example of a convergence criterion is to compute the root-mean-square (RMS) of the residuals as in Equation 54

$$R^{(p)} = \sqrt{\frac{\varepsilon^T \varepsilon}{q - 7m}}$$

Equation 54

The value in the denominator of Equation 54 represents the number of degrees of freedom (e.g., the number of observation equations minus the number of estimated parameters).

Since typically q»7m Equation 54 can be estimated as in Equation 55

$$R^{(p)} = \sqrt{\frac{\varepsilon^T \varepsilon}{q}}$$

Equation 55

The condition $q \gg 7m$ can be guaranteed with sufficient redundancy of ground point observations as compared with the number of images (e.g., enough tie points are measured between the images so that the aforementioned condition is satisfied).

Convergence happens when the residuals settle to the same values on consecutive iterations. The convergence criterion can be $$|R^{(p)} - R^{(p-1)}| < \delta \quad \text{Equation 56}$$

where $\delta$ is a prescribed tolerance.

A rigorous formulation for the standard error of unit weight (to be used in error propagation discussed elsewhere) is provided in Equation 57

$$[\sigma^{(p)}]^2 = \frac{\sum_{j=1}^{n} \sum_{i \in I_j} \varepsilon_{ij}^T \tilde{W}_{ij} \varepsilon_{ij} + \sum_{i=1}^{m} \dot{C}_i^T \dot{W}_i \dot{C}_i + \sum_{j=1}^{n} \ddot{C}_j^T \ddot{W}_j \ddot{C}_j}{ndof} \quad \text{Equation 57}$$

where ndof is the number of degrees of freedom—the number of observation equations minus the number of error model solution parameters:

$$ndof = q - 7m \quad \text{Equation 58}$$

Since blundered points can be effectively removed from the solution via deweighting, the number of observations remaining effectively doesn't include the blunders. To be strictly correct, the value for q in Equation 58 can be the number of non-blundered observations.

The full form of the matrix Equation 34 can be reduced under the assumption that the errors in the ground point locations are uncorrelated. Under this assumption, the error covariance matrix of the ground point locations $\ddot{\Sigma}$ becomes a block-diagonal matrix of 3×3 matrix blocks. Since it is a sparse matrix, its inverse is easily computed by inverting the 3×3 diagonal blocks. The development in this section reformulates the normal equations taking advantage of this. The result is a reduced normal equation matrix in which the size of the normal matrix is 6m×6m instead of (6m+3n)×(6m+3n). This gives the obvious advantage that the size of the normal matrix is much smaller and remains invariant with the number of ground points.

The reduced system formation is sometimes referred to as a "ground point folding," since the ground point portion of the reduced normal matrix is incorporated into the image portion. The development of the reduced normal equation begins with the original normal equation from Equation 34 and repeated as Equation 59

$$Z\Delta = H \quad \text{Equation 59}$$

To facilitate ground point folding into a reduced normal equation matrix, Equation 59 can be re-written as Equation 60

$$\begin{bmatrix} \dot{Z}_{7m \times 7m} & Z_{7m \times 3n} \\ Z^T_{3n \times 6m} & \ddot{Z}_{3n \times 3n} \end{bmatrix} \begin{bmatrix} \dot{\Delta}_{7m \times 1} \\ \ddot{\Delta}_{3n+1} \end{bmatrix} = \begin{bmatrix} \dot{H}_{7m \times 1} \\ \ddot{H}_{3n+1} \end{bmatrix} \quad \text{Equation 60}$$

where $$\dot{Z} = \dot{N} + \dot{W} \quad \text{Equation 61}$$

$$\bar{Z} = \bar{N} \quad \text{Equation 62}$$

$$\ddot{Z} = \ddot{N} + \ddot{W} \quad \text{Equation 63}$$

$$\dot{H} = \dot{K} - \dot{W}\dot{C} \quad \text{Equation 64}$$

$$\ddot{H} = \ddot{K} - \ddot{W}\ddot{C} \quad \text{Equation 65}$$

Suppose a matrix system $Z\Delta = H$ is partitioned into blocks of the appropriate sizes as $$\begin{bmatrix} A & B \\ C & D \end{bmatrix} \begin{bmatrix} a \\ b \end{bmatrix} = \begin{bmatrix} c \\ d \end{bmatrix} \quad \text{Equation 66}$$

where the matrices A and D are both square.

Further, assume that matrix D is non-singular and can be represented as a sparse block diagonal matrix. Then $$[A - BD^{-1}C][a] = [c - BD^{-1}d] \quad \text{Equation 67}$$

Applying Equation 67 to Equation 59 provides the reduced normal matrix equation $$[\dot{Z} - \bar{Z}\ddot{Z}^{-1}\bar{Z}^T][\dot{\Delta}] = [\dot{H} - \bar{Z}\ddot{Z}^{-1}\ddot{H}] \quad \text{Equation 68}$$

The reduced normal equation matrix can be written as in Equation 69

$$M\dot{\Delta} = C \quad \text{Equation 69}$$

where $M \equiv [\dot{Z} - \bar{Z}\ddot{Z}^{-1}\bar{Z}^T]$ and $C \equiv [\dot{H} - \bar{Z}\ddot{Z}^{-1}\ddot{H}]$.

Next it is of interest to examine the form of the components of the reduced system for an efficient implementation. Let $\hat{Z} = \bar{Z}\ddot{Z}^{-1}\bar{Z}^T$. Then $$\hat{Z}_{7m \times 7m} = \begin{bmatrix} \bar{Z}_{11} & \cdots & \bar{Z}_{1n} \\ \vdots & \ddots & \vdots \\ \bar{Z}_{m1} & \cdots & \bar{Z}_{mn} \end{bmatrix} \begin{bmatrix} \ddot{Z}_1^{-1} & 0 & \cdots & 0 \\ 0 & \ddot{Z}_2^{-1} & \cdots & 0 \\ \vdots & \vdots & \ddots & \vdots \\ 0 & 0 & \cdots & \ddot{Z}_n^{-1} \end{bmatrix} \begin{bmatrix} \bar{Z}_{11}^T & \cdots & \bar{Z}_{m1}^T \\ \vdots & \ddots & \vdots \\ \bar{Z}_{1n}^T & \cdots & \bar{Z}_{mn}^T \end{bmatrix} \quad \text{Equation 70}$$

By extension $$\hat{Z}_{7m \times 7m} = \begin{bmatrix} \sum_{j=1}^{n} \bar{Z}_{1j} \ddot{Z}_j^{-1} \bar{Z}_{1j}^T & \sum_{j=1}^{n} \bar{Z}_{1j} \ddot{Z}_j^{-1} \bar{Z}_{2j}^T & \cdots & \sum_{j=1}^{n} \bar{Z}_{1j} \ddot{Z}_j^{-1} \bar{Z}_{mj}^T \\ \sum_{j=1}^{n} \bar{Z}_{2j} \ddot{Z}_j^{-1} \bar{Z}_{1j}^T & \sum_{j=1}^{n} \bar{Z}_{2j} \ddot{Z}_j^{-1} \bar{Z}_{2j}^T & \cdots & \sum_{j=1}^{n} \bar{Z}_{2j} \ddot{Z}_j^{-1} \bar{Z}_{mj}^T \\ \vdots & \vdots & \ddots & \vdots \\ \sum_{j=1}^{n} \bar{Z}_{mj} \ddot{Z}_j^{-1} \bar{Z}_{1j}^T & \sum_{j=1}^{n} \bar{Z}_{mj} \ddot{Z}_j^{-1} \bar{Z}_{2j}^T & \cdots & \sum_{j=1}^{n} \bar{Z}_{mj} \ddot{Z}_j^{-1} \bar{Z}_{mj}^T \end{bmatrix} \quad \text{Equation 71}$$

The blocks of $\hat{Z}$ in Equation 71 can be the equivalent $\bar{N}_{ij}$ as defined in equation 47.

The assumption that errors in the a priori ground points are uncorrelated yields Equation 72

$$\ddot{W}_{3n \times 3m} = \begin{bmatrix} \ddot{\Sigma}_1^{-1}{}_{3 \times 3} & 0 & \cdots & 0 \\ 0 & \ddot{\Sigma}_2^{-1}{}_{3 \times 3} & \cdots & 0 \\ \vdots & \vdots & \ddots & \vdots \\ 0 & 0 & \cdots & \ddot{\Sigma}_n^{-1}{}_{3 \times 3} \end{bmatrix} \quad \text{Equation 72}$$

where $\ddot{\Sigma}_j^{-1}$ is the inverse of the a priori covariance matrix for ground point j. Thus $$\ddot{Z}_j^{-1}_{3\times 3} = [\ddot{N}_j + \ddot{W}_j]^{-1} \qquad \text{Equation 73}$$

The general row and column term for $\hat{Z}$ can then be given by $$\hat{Z}_{r,c}_{7\times 7} = \sum_{j=1}^{n} \overline{Z}_{rj} \ddot{Z}_j^{-1} \overline{Z}_{cj}^T \qquad \text{Equation 74}$$

and, by the definition of $\overline{Z}_{ij}$, $\hat{Z}_{r,c}$ is zero if and only if images r and c have no ground points in common. Also note that 2 is block symmetric. Thus, in its formation, only the upper block triangle need be formed, followed by reflection of the upper right triangle to the lower left triangle for completion of the matrix formation.

The matrix M can thus be written as in Equation 75

$$\underset{(7m\times 7m)}{M} = \begin{bmatrix} \dot{Z}_1 & 0 & \cdots & 0 \\ 0 & \dot{Z}_2 & \cdots & 0 \\ \vdots & \vdots & \ddots & \vdots \\ 0 & 0 & \cdots & \dot{Z}_p \end{bmatrix} - \qquad \text{Equation 75}$$

$$\begin{bmatrix} \sum_{j=1}^{n} \overline{Z}_{1j} \ddot{Z}_j^{-1} \overline{Z}_{1j}^T & \sum_{j=1}^{n} \overline{Z}_{1j} \ddot{Z}_j^{-1} \overline{Z}_{2j}^T & \cdots & \sum_{j=1}^{n} \overline{Z}_{1j} \ddot{Z}_j^{-1} \overline{Z}_{mj}^T \\ \sum_{j=1}^{n} \overline{Z}_{2j} \ddot{Z}_j^{-1} \overline{Z}_{1j}^T & \sum_{j=1}^{n} \overline{Z}_{2j} \ddot{Z}_j^{-1} \overline{Z}_{2j}^T & \cdots & \sum_{j=1}^{n} \overline{Z}_{2j} \ddot{Z}_j^{-1} \overline{Z}_{mj}^T \\ \vdots & \vdots & \ddots & \vdots \\ \sum_{j=1}^{n} \overline{Z}_{mj} \ddot{Z}_j^{-1} \overline{Z}_{1j}^T & \sum_{j=1}^{n} \overline{Z}_{mj} \ddot{Z}_j^{-1} \overline{Z}_{2j}^T & \cdots & \sum_{j=1}^{n} \overline{Z}_{mj} \ddot{Z}_j^{-1} \overline{Z}_{mj}^T \end{bmatrix}$$

The reduced matrix M can be formed by first storing the diagonal entries of $\dot{Z}$ and then subtracting the summed entries of the subtrahend in Equation 75 (namely the $\hat{Z}_{r,c}$ defined in Equation 74).

Since the subblocks of the subtrahend are merely summations over the ground point indexes, j, the matrix, M, can be built by iterating over the ground points (assuming the minuend of Equation 75 on-diagonals were formed in advance) and subtracting out the contributions for a particular ground point in the appropriate place within M.

The constant column vector C can be formed similarly with some of the same matrices:

$$C = \begin{bmatrix} \dot{H}_1 \\ \vdots \\ \dot{H}_m \end{bmatrix} - \begin{bmatrix} \sum_{j=1}^{n} \overline{Z}_{1j} \ddot{Z}_j^{-1} \ddot{H}_j \\ \vdots \\ \sum_{j=1}^{n} \overline{Z}_{mj} \ddot{Z}_j^{-1} \ddot{H}_j \end{bmatrix} \qquad \text{Equation 76}$$

After the matrices M and C are built, the solution vector for the adjustable parameters from the reduced system can be computed as $$\dot{\Delta} = M^{-1} C \qquad \text{Equation 77}$$

The solution vector can be decomposed into per-image-adjustable vectors di for each image i as in Equation 78:

$$\dot{\Delta} = \begin{bmatrix} \dot{\Delta}_1 \\ \dot{\Delta}_2 \\ \vdots \\ \dot{\Delta}_m \end{bmatrix} \qquad \text{Equation 78}$$

After the solution vector $\dot{\Delta}$ for the image-adjustable parameters is obtained, the solution vector $\ddot{\Delta}$ for corrections to the ground point positions can be extracted (or "unfolded") from the reduced system. To formulate the extraction, Equation 67 can be used to obtain Equation 79

$$\ddot{\Delta}_{3n\times 1} = \ddot{Z}^{-1} [\ddot{H} - \overline{Z}^T \dot{\Delta}] \qquad \text{Equation 79}$$

If $$\ddot{\Delta}_{3n\times 1} = \begin{bmatrix} \ddot{\Delta}_1 \\ _{3\times 1} \\ \ddot{\Delta}_2 \\ _{3\times 1} \\ \vdots \\ \ddot{\Delta}_n \\ _{3\times 1} \end{bmatrix} \qquad \text{Equation 80}$$

represents the correction vector for the ground points then $$\begin{bmatrix} \ddot{\Delta}_1 \\ _{3\times 3} \\ \ddot{\Delta}_2 \\ _{3\times 3} \\ \vdots \\ \ddot{\Delta}_n \\ _{3\times 3} \end{bmatrix} = \begin{bmatrix} \ddot{Z}_1^{-1} & 0 & \cdots & 0 \\ _{(3\times 3)} & & & \\ 0 & \ddot{Z}_2^{-1} & \cdots & 0 \\ & _{(3\times 3)} & & \\ \vdots & \vdots & \ddots & \vdots \\ 0 & 0 & \cdots & \ddot{Z}_n^{-1} \\ & & & _{(3\times 3)} \end{bmatrix} \begin{bmatrix} \ddot{H}_1 \\ _{3\times 1} \\ \ddot{H}_2 \\ _{3\times 1} \\ \vdots \\ \ddot{H}_n \\ _{3\times 1} \end{bmatrix} - \qquad \text{Equation 81}$$

$$\begin{bmatrix} \overline{Z}_{11}^T & \cdots & \overline{Z}_{m1}^T \\ _{(3\times 7)} & & _{(3\times 7)} \\ \vdots & \ddots & \vdots \\ \overline{Z}_{1n}^T & \cdots & \overline{Z}_{mn}^T \\ _{(3\times 7)} & & _{(3\times 7)} \end{bmatrix} \begin{bmatrix} \dot{\Delta}_1 \\ _{7\times 1} \\ \dot{\Delta}_2 \\ _{7\times 2} \\ \vdots \\ \dot{\Delta}_m \\ _{7\times 1} \end{bmatrix}$$

where $\dot{\Delta}_i$ is the adjustable parameter correction vector for image i. Thus $$\ddot{\Delta}_j_{3\times 1} = \ddot{Z}_j^{-1} \left[ \ddot{H}_j - \sum_{i\in I_j} \overline{Z}_{ij}^T \dot{\Delta}_i \right] \qquad \text{Equation 82}$$

where $I_j$ is as defined in Table 5 (the index set of images upon which ground point j is an observation).

This section provides formulations for extraction of a posteriori error covariances for ground points. If a priori sensor model error estimates are available (and reliable), the errors may be propagated to the space of the registration error models. In this case, the error propagation is a rigorous predicted error for the accuracy of the a posteriori ground point locations.

The a posteriori error covariances of the image parameters are the appropriate subblocks of the inverse of the reduced normal matrix $M^{-1}$ from Equation 69 (after application of the variance of unit weight, as described at the end of this section). For the full normal matrix solution, the a posteriori error covariance can be the inverse of the normal matrix, $Z^{-1}$, times the variance of unit weight. For the reduced system, however, the a posteriori error covariances of the ground points can be extracted from $M^{-1}$ by unfolding. To facilitate this, the full normal matrix can be written as $$Z = \begin{bmatrix} \dot{Z}_{(7m \times 7m)} & \bar{Z}_{(7m \times 3m)} \\ \bar{Z}^T_{(3n \times 7m)} & \ddot{Z}_{(3n \times 3n)} \end{bmatrix} \quad \text{Equation 83}$$

Denote the inverse matrix blocks as $$Z^{-1} \begin{bmatrix} \dot{\Sigma} & \bar{\Sigma} \\ \bar{\Sigma}^T & \ddot{\Sigma} \end{bmatrix} \quad \text{Equation 84}$$

Note that, $\dot{\Sigma}$ and $\ddot{\Sigma}$ as defined are distinctly different from those defined in previous sections. (The symbols in the present section are a posteriori covariances and those in previous sections are a priori covariances). However, this subtle distinction is not problematic if the appropriate context is adhered.

$$\ddot{\Sigma}_{3n \times 3n} = \ddot{Z}^{-1} + \ddot{Z}^{-1} \bar{Z}^T \sum \bar{Z} \ddot{Z}^{-1} \quad \text{Equation 85}$$

The a posteriori covariance between ground points r and c can be represented as block element $$\ddot{\Sigma}_{r,c}_{3 \times 3}$$

of $\ddot{\Sigma}$. With n as the number of ground points and m as the number of images, $$\sum = \begin{bmatrix} \ddot{\Sigma}_{11} & \cdots & \ddot{\Sigma}_{1n} \\ \vdots & \ddots & \vdots \\ \ddot{\Sigma}_{n1} & \cdots & \ddot{\Sigma}_{nn} \end{bmatrix} = \begin{bmatrix} \ddot{Z}_1^{-1} & 0 & \cdots & 0 \\ 0 & \ddot{Z}_2^{-1} & \cdots & 0 \\ \vdots & \vdots & \ddots & \vdots \\ 0 & 0 & \cdots & \ddot{Z}_n^{-1} \end{bmatrix} + \quad \text{Equation 86}$$

$$\begin{bmatrix} \ddot{Z}_1^{-1} & 0 & \cdots & 0 \\ 0 & \ddot{Z}_2^{-1} & \cdots & 0 \\ \vdots & \vdots & \ddots & \vdots \\ 0 & 0 & \cdots & \ddot{Z}_n^{-1} \end{bmatrix} \bar{Z}^T \sum \bar{Z} \begin{bmatrix} \ddot{Z}_1^{-1} & 0 & \cdots & 0 \\ 0 & \ddot{Z}_2^{-1} & \cdots & 0 \\ \vdots & \vdots & \ddots & \vdots \\ 0 & 0 & \cdots & \ddot{Z}_n^{-1} \end{bmatrix}$$

The $r^{th}$ row of $\ddot{\Sigma}$ involves only $\ddot{Z}_r^{-1}$ of the first $\ddot{Z}^{-1}$ matrix in term two of Equation 86. Similarly, the $c^{th}$ column of $\ddot{\Sigma}$ involves only $\ddot{Z}_c^{-1}$ of the second $\ddot{Z}^{-1}$ matrix in term two. Thus $$\ddot{\Sigma}_{r,c} = \delta(r,c)\ddot{Z}_c^{-1} + \ddot{Z}_r^{-1} \bar{Z}^T \dot{\Sigma} \bar{Z} \ddot{Z}_c^{-1} \quad \text{Equation 87}$$

where the delta function can be $$\delta(r,c) \equiv \begin{cases} 1 & \text{if } r = c \\ 0 & \text{otherwise} \end{cases} \quad \text{Equation 88}$$

Now the form of the (r,c) block of $\bar{Z}^T \dot{\Sigma} \bar{Z}$ is derived. Let $$G_{3m \times 3m} \equiv \bar{Z}^T \sum \bar{Z} = \quad \text{Equation 89}$$

$$\begin{bmatrix} \bar{Z}^T_{11} & \cdots & \bar{Z}^T_{m1} \\ (3 \times 7) & & (3 \times 7) \\ \vdots & \ddots & \vdots \\ \bar{Z}^T_{1n} & \cdots & \bar{Z}^T_{mn} \\ (3 \times 7) & & (3 \times 7) \end{bmatrix} \begin{bmatrix} \dot{\Sigma}_{11} & \dot{\Sigma}_{12} & \cdots & \dot{\Sigma}_{1m} \\ (7 \times 7) & (7 \times 7) & & (7 \times 7) \\ \dot{\Sigma}_{21} & \dot{\Sigma}_{22} & \cdots & \dot{\Sigma}_{2m} \\ (7 \times 7) & (7 \times 7) & & (7 \times 7) \\ \vdots & \vdots & \ddots & \vdots \\ \dot{\Sigma}_{m1} & \dot{\Sigma}_{m1} & \cdots & \dot{\Sigma}_{mm} \\ (7 \times 7) & (7 \times 7) & & (7 \times 7) \end{bmatrix} \begin{bmatrix} \bar{Z}_{11} & \cdots & \bar{Z}_{1n} \\ (7 \times 3) & & (7 \times 3) \\ \vdots & \ddots & \vdots \\ \bar{Z}_{m1} & \cdots & \bar{Z}_{mn} \\ (7 \times 3) & & (7 \times 3) \end{bmatrix}$$

The $r^{th}$ row of G involves only the $r^{th}$ row of $\bar{Z}^T$ and the $c^{th}$ column of G involves only the $c^{th}$ column of $\bar{Z}$. Thus $$G_{r,c}_{3 \times 3} = \bar{Z} = \quad \text{Equation 90}$$

$$\begin{bmatrix} \bar{Z}^T_{1r} \dot{\Sigma}_{11} + \cdots + \bar{Z}_{mr} \dot{\Sigma}_{m1} & \bar{Z}^T_{1r} \dot{\Sigma}_{12} + \cdots + \bar{Z}_{mr} \dot{\Sigma}_{m2} & \cdots \end{bmatrix}$$

$$\begin{bmatrix} \sum_{s=1}^m \bar{Z}^T_{sr} \dot{\Sigma}_{s1} & \sum_{s=1}^m \bar{Z}^T_{sr} \dot{\Sigma}_{s2} & \cdots \end{bmatrix} \begin{bmatrix} \bar{Z}_{1c} \\ \bar{Z}_{2c} \\ \vdots \\ \bar{Z}_{mc} \end{bmatrix} =$$

$$\sum_{t=1}^m \left[ \sum_{s=1}^m \bar{Z}^T_{sr} \dot{\Sigma}_{st} \right] \bar{Z}_{tc}$$

Now $\bar{Z}_{ij}=0$ if ground point j is not an observation on image i.

Thus $$T_{r,c} = \Sigma_{t \in I_c} [\Sigma_{s \in I_r} \bar{Z}^T_{sr} \dot{\Sigma}_{st}] \bar{Z}_{tc} \quad \text{Equation 91}$$

where $I_j$ is the index set of images upon which ground point j is an observation. Substituting Equation 91 into Equation 87 yields $$\ddot{\Sigma}_{r,c} = \delta(r,c)\ddot{Z}_c^{-1} + \ddot{Z}_r^{-1}[\Sigma_{t \in I_c}[\Sigma_{s \in I_r} \bar{Z}_{sr} \dot{\Sigma}_{st}] \bar{Z}_{tc}] \ddot{Z}_c^{-1} \quad \text{Equation 92}$$

The a posteriori covariance is usually defined by scaling the inverse of the normal matrix by an estimate of the variance of unit weight. An estimate of the variance of unit weight is denoted as $[\sigma^{(p)}]^2$ and is provided in Equation 57. Thus, the above formulation can be used, but instead defining $$\begin{bmatrix} \dot{\Sigma} & \bar{\Sigma} \\ \bar{\Sigma}^T & \ddot{\Sigma} \end{bmatrix} = [\sigma^{(p)}]^2 [Z^{-1}] \quad \text{Equation 93}$$

For a full normal matrix solution, $Z^{-1}$ is readily available, thus the a posteriori covariance of the error model parameters and ground points can be the right hand side of Equation 93.

The right hand summand of Equation 92 includes the factor $[\sigma^{(p)}]^2$ since it includes $\dot{\Sigma}_{st}$. However, the left hand summand does not include the factor. This can be compensated for by a modified form of Equation 92

$$\ddot{Z}_{r,c} = [\sigma^{(p)}]^2 \delta(r,c) \ddot{Z}_c^{-1} + \ddot{Z}_r^{-1}[\Sigma_{t \in I_c}[\Sigma_{t \in I_r} \bar{Z}_{sr}^T \dot{\Sigma}_{st}] \bar{Z}_{tc}] \ddot{Z}_c^{-1} \quad \text{Equation 94}$$

If the standard error of unit weight $\sigma^{(p)}$ is deemed to be unreliable (e.g., is much greater than unity) this may be an indicator of improper (or incorrect) a priori error covariance in the process. One can still, however, be able to provide a reliable error estimate from the least squares process by simply forcing the standard error to one (e.g., by setting $\sigma^{(p)} \leftarrow 1.0$ in Equations 93 and 94.

FIG. 10 illustrates an example of an embodiment of the operation 818. The operation 818 can include 3D data set registration with error propagation. The operation 818, as illustrated, includes initializing solution and corrections, at operation 1002; determining discrepancies, at operation 1004; determining the normal equation, at operation 1006; updating parameters based on the determined normal equation, at operation 1008; determining discrepancies, at operation 1010; determining error, at operation 1012; and compensating misregistration of the first 3D point set 102A and the second 3D point set 102B, at operation 1014.

The operation 1002 can include setting the solution vector X and the correction vector $\Delta X$ to the zero vector[1]:

$$X = \underset{7\times 1}{0}$$
$$\Delta X = \underset{7\times 1}{0}$$

The solution vector X can be set to a fixed-point location for the linearization. If an a priori estimate is available, it can be used here in place of the zero vector.

The operation 1004 can include computing the discrepancy vector for each observation as provided in Equation 29. The operation 1006 can include building the normal equations matrices and solving for the correction vector as provided in Equation 53. The operation 1008 can include updating the parameter vector for the current iteration as provided in Equations 51 and 52. Details of the operation 1008 for unfolding of the ground points for the folded normal equation solution is provided via pseudocode below.

The operation 1010 can include computing the discrepancies as provided in Equation 29. The operation 1012 can include computing a standard error of unit weight via Equation 57. Note that the standard error can the square root of the left hand side of the Equation 57 (e.g., $\sigma^{(p)} = \sqrt{[\sigma^{(p)}]^2}$).

If the delta between the current and previous standard error of unit weight is less than the convergence criterion in absolute value, the solution nominally converged. To accommodate blunder rejection, the convergence criterion check can be augmented with a check to see if the blunder weights should be used in continuation of the solution ("useBW", indicating to use "blunder-checking weighting"). If convergence occurs and useBW is true, this is an indicator to perform blunder checking, and this time using a normalized residual computation in order to check for blunders on the next iteration.

If useBW is true, blunders can be computed. If there are blunders remaining, the blunder "cycle" number is incremented and the process is repeated with the correction vector reset to a priori values (e.g., go to operation 1002). If there are no blunders remaining, a check can be performed to see if the number of post convergence blunder cycles can be set to zero. This check can be performed to effectively force one more solution after all blunders have been eliminated.

If useBW is false and it is currently a first iteration of a blundering solution, useBW can be set to true. This has the effect of forcing the normalized residual blunder iteration for determining the blunders on subsequent iterations. In this case, a solution has converged but normalized blunder residuals have not been computed. Setting useBW to true can forces this to happen on the next solution iteration. The solution can be iterated by going to the operation 1006. If there are no more blunders and the number of blunders is not zero, this indicates the "non-blunder iteration" solution has converged.

The operation 818 can include providing a report that includes an iteration number, current correction vector $\Delta X$, current iteration estimates of parameters and ground points (e.g., as computed in equations 51 and 52), standard error of unit weight (e.g., as provided in Equation 55). The operation 818 can include a check for non-convergence by examining the current iteration number with a maximum number of iterations, M. If the number of iterations exceeds the maximum, stop the iteration process. The solution did not converge. An exception can be raised and the operation 818 can be complete.

The following is a pseudocode outline for the operation 818 for computing the full normal equations solution. This first pseudocode does not include ground point folding.

The names in {braces} allude to method (e.g., function) names in a software implementation. Also, within the development below, ground point indexes, ground point observation indexes and image indexes are assumed to be zero-relative. For efficiency in the implementation, the following elements can be cached in a per-image workspace object, which is updated with each iteration:

1. Values for trig functions $s\omega$, $c\Omega$, $s\Omega$, $c\Omega$, $s\kappa$, $c\kappa$ as given in Equation 4.
2. Three 3×3 partial derivative matrices of T with respect to the three angles as given in the following Equations 95-97:

$$T^\omega \equiv \frac{\partial T}{\partial \omega} = \begin{bmatrix} 0 & -s\omega s\kappa + c\omega s\phi c\kappa & c\omega s\kappa + s\omega s\phi c\kappa \\ 0 & -s\omega c\kappa - c\omega s\phi s\kappa & c\omega c\kappa - s\omega s\phi s\kappa \\ 0 & -c\omega c\phi & -s\omega c\phi \end{bmatrix} \quad \text{Equation 95}$$

$$T^\phi \equiv \frac{\partial T}{\partial \phi} = \begin{bmatrix} -s\phi c\kappa & s\omega c\phi c\kappa & -c\omega c\phi c\kappa \\ s\phi s\kappa & -s\omega c\phi s\kappa & c\omega c\phi s\kappa \\ c\phi & s\omega s\phi & -c\omega s\phi \end{bmatrix} \quad \text{Equation 96}$$

$$T^\kappa \equiv \frac{\partial T}{\partial \kappa} = \begin{bmatrix} -c\phi s\kappa & c\omega s\kappa - s\omega s\phi s\kappa & s\omega c\kappa + c\omega s\phi s\kappa \\ -c\phi c\kappa & -c\omega c\kappa - s\omega s\phi c\kappa & -s\omega s\kappa + c\omega s\phi c\kappa \\ 0 & 0 & 0 \end{bmatrix} \quad \text{Equation 97}$$

3. Rotation matrix $T_i$ as given in Equation 4.
4. 3×1 vector $\overline{V}_i$

The pseudocode begins by setting the non-linear least squares iteration index (p) to zero.

1. {initializeData} Store nominal initial values for the solved parameters for each image $i \in \{0, \ldots, m-1\}$. The initial values for $\overline{V}_i^{(0)}$ and $\theta_i^{(0)}$.

$$\hat{C}_i^{(0)} \equiv \begin{bmatrix} \overline{V}_i^{(0)} \\ \theta_i^{(0)} \\ s_i^{(0)} \end{bmatrix}_{7\times 1} \quad \text{Equation 98}$$

2. {initializeData} Compute
   a. Initial ground point coordinates via Equation 11 for each ground point $j \in \{0, \ldots, n-1\}$. These form $\hat{C}_j^{(0)}$
   b. initial image cache data as described previously.
3. {outputIterationReport} Output initial iteration report (input parameters, initial ground point and ground point observation coordinates.)

4. {initializeMatrices} Block partition the $\ddot{N}$ portion of Z into in subblocks, each of size 6×6.
5. {initializeMatrices} Block partition the $\ddot{N}$ portion of Z into n subblocks, each of size 3×3.
6. {initializeMatrices} Block partition H similarly
7. {computeAndStoreDiscrepancies} For each ground point index j∈{0, . . . , n−1} and each observation of that ground point i∈$O_j$, compute the discrepancy vector given in Equation 29 as follows.

for j∈{0, . . . , n−1}
   {
   Fetch the most recent ground point position $\hat{V}_j$.
   for i∈$I_j$ and observation index b∈$O_j$
   {
   a) Retrieve image-cached values for $T_i$ and $\nabla_i$
   b) Retrieve ground point observation $\check{V}_{ij}=\tilde{V}_b$
   c) Apply the observation equation to obtain the projected value for $\hat{V}_j$.

$V_{ij}=(1+s_i)T_i(\hat{V}_j-\overline{V}_i)$  Equation 99 d) Compute and store the discrepancy vector for observation b as in Equation 29

$\varepsilon_b=\varepsilon_{ij}=-[\tilde{V}_{ij}-V_{ij}]$  Equation 100

}//end for i
   }//end for j

8. Compute the standard error of unit weight as in Equation 57.
9. {builddNormalMatrices+initialize Weights} Zero Z and H and initialize Z (and likewise H) with the block weight matrices on the diagonal. This involves setting the blocks of Z to the subblocks of $\ddot{W}$ and $\dddot{W}$, and setting the subblocks (subrows) of H to $-\ddot{W}\ddot{C}$ and $-\dddot{W}\ddot{C}$.
10. {sumInPartials} Loop over ground points and images containing the ground points and sum in the contributions of the $\dot{B}$ and $\ddot{B}$ matrices into Z and H.

for j∈{0, . . . , n−1}

---

{
  for i ∈ $I_j$
  {
  Retrieve $\varepsilon_b \equiv \varepsilon_{ij}$ as computed in Equation 100
  Compute $\dot{B}_{ij}$ and $\ddot{B}_{ij}$ as in Equations 101 and 102.

$\dot{B}_{ij}_{3\times 7} = \begin{bmatrix} (1+s_i)T_i & (1+s_i)A_{ij} & -T_iY_{ij} \\ 3\times 3 & 3\times 3 & 3\times 1 \end{bmatrix}$   Equation 101

$\ddot{B}_{ij}_{3\times 3} = -(1+s_i)[T_i]_{3\times 3}$   Equation 102

Retrieve observation weight matrix $\ddot{W}_{ij}$
  $\dot{N}_i$ : Sum $\dot{B}_{ij}^T\ddot{W}_{ij}\dot{B}_{ij}$ into Z.block(i, i)
  $\ddot{N}_j$ : Sum $\ddot{B}_{ij}^T\ddot{W}_{ij}\ddot{B}_{ij}$ into Z.block(m + j, m + j)
  $\overline{N}_{ij}$ : Sum $\dot{B}_{ij}^T\ddot{W}_{ij}\ddot{B}_{ij}$ into Z.block(i, m + j)
  $\dot{C}_i$ : Sum $\dot{B}_{ij}^T\ddot{W}_{ij}\varepsilon_{ij}$ into H.block(i, 0)
  $\ddot{C}_j$ : Sum $\ddot{B}_{ij}^T\ddot{W}_{ij}\varepsilon_{ij}$ into H.block(m + j, 0)
  } //end i
  } // end j

---

11. {solveNormalEquation} Form the lower transpose of the Z matrix and solve the system $\Delta=Z^{-1}$ H. Note that the normal equation system is a symmetric system (e.g., the normal matrix Z is symmetric). Thus, a symmetric system solver can be used. In the case of a symmetric system solver, it may not be necessary to form the lower triangle.
12. {updateParameters} Update all the parameters by extracting the corrections from the $\Delta$ matrix as in Equations 51 and 52,
13. If (p)≠0 compare with the previous root mean square (RMS) of residuals and check for convergence. The convergence condition can be $|R^{(p)}-R^{(p-1)}|<\delta$  Equation 103

14. {computePostConvergenceResiduals+checkForBlunders} If convergence has been reached, perform automatic blunder editing. If convergence has not been reached, increment the iteration index $(p) \leftarrow (p+1)$  Equation 104 and go to step 7.

What follows is pseudocode for the operation 818 for building the reduced normal equations system, computing corrections to ground point positions and performing error propagation via extraction of data from the reduced normal matrix. This portion of the pseudocode includes ground point coordinate folding.

As in the full normal solution provided in the previous pseudocode, the same per-image elements are cached in a workspace object and updated with each iteration. The algorithm for the reduced solution can be broken into two major portions: priming and folding. Priming involves storing of weights and the contributions along the diagonal of the full normal equation matrix (and corresponding data for the right hand column vector H). This corresponds to the $\dot{Z}$ portion of Z. Thus, priming involved formation of the minuends of Equation 75 and Equation 76. Folding can include incorporation of the subtrahends of the aforementioned Equations.

To provide an efficient implementation, a ground point workspace can be created. The workspace can include the following elements: $\ddot{Z}_j$, $\ddot{H}$, $\ddot{Z}_j^{-1}$. These things are indexed by ground point for the ground point workspace. The technique can begin by setting the non-linear least squares iteration index (p) to zero.

1. {initializeData} Store nominal initial values for the solved parameters for each image i∈{0, . . . , m−1}. The initial values for $\nabla_i^{(0)}$ and $\theta_i^{(0)}$ can also be set along with $\dot{C}_i^{(0)}$ as in Equation 98.
2. {initial Data} Compute
   a. Initial ground point coordinates via Equation 11 for each ground point j∈{0, . . . , n−1}. These form $\ddot{C}_j^{(0)}$.
   b. Initial image cache data as described above.
3. {outputIterationReport} Output initial iteration report (input parameters, initial ground point, and ground point observation coordinates).
4. {initializeMatrices} Block partition the reduced normal matrix M into m subblocks, each of size 6×6. Block partition the reduced column vector C similarly
5. {computeAndStoreDiscrepancies} For each ground point index j∈{0, . . . , n−1} and each observation of that ground point i∈$O_j$, compute the discrepancy vector $\varepsilon_{ij}$ given in Equation 29 as:

for j∈{0, . . . , n−1}
   {
   Fetch the most recent ground point position $\hat{V}_j$.
   for i∈$I_j$ and observation index b∈$O_j$
   {
   a) Retrieve image-cached values for $T_i$ and $\nabla_i$
   b) Retrieve ground point observation $\check{V}_{ij}=\tilde{V}_b$
   c) Apply the observation equation to obtain the projected value for $\hat{V}_j$ from Equation 99.
   d) Compute and store the discrepancy vector for observation b as in Equation 100
   }//end for i
   }//end for j 6. Compute the standard error of unit weight as in Equation 57.
7. {buildNormalMatrices}
a. Zero the reduced matrices M and C
b. {initializeWeights} Initialize M (and likewise C) with the block weight matrices on the diagonal. This involves setting the blocks of M to the subblocks of $\dot{W}$ and setting the subblocks (subrows) of C to $-\dot{W}\dot{C}$.
c. {sumInPartialsAndFoldGPs} Form the main diagonal and ground point matrices $\ddot{Z}_j$ by iterating over ground points. Perform folding for ground point j
for $j \in \{0, \ldots, n-1\}$
{
  PRIMING:
  Store $\ddot{W}_j$ into $\ddot{Z}_j$ of GPWS
  Store $-\ddot{W}_j\ddot{C}_j$ into $\ddot{H}_j$ of GPWS
  for $i \in I_j$ (where $I_j$ is set of image indexes upon which GP j is an observation)
  {
    Form partial derivatives:
      Build $\dot{B}_{ij}$ as in Equation 101
      Build $\ddot{B}_{ij}$ as in Equation 102
      Retrieve discrepancy vector $\varepsilon_{ij}$ as computed in Equation 100.
      Retrieve observation weight matrix $\tilde{W}_{ij}$
    Sum in contribution of GP j's obs in image i within M:
      Sum $\dot{B}_{ij}^T \tilde{W}_{ij} \dot{B}_{ij}$ into M·block(i,i)
      Sum $\dot{B}_{ij}^T \tilde{W}_{ij} \varepsilon_{ij}$ into C·block(i,0)
    Sum in i's contribution to $\ddot{Z}_j$ and $\ddot{H}_j$.
      Sum $\ddot{B}_{ij}^T \tilde{W}_{ij} \ddot{B}_{ij}$ into $\ddot{Z}_j$
      Sum $\ddot{B}_{ij}^T \tilde{W} \varepsilon_{ij}$ into $\ddot{H}_j$
  }//end i
  Invert $\ddot{Z}_j$ and store into GPWS as $\ddot{Z}_j^{-1}$
  FOLDING INTO M (note: iteration loop over j is still valid)
  for $r \in I_j$
  {
    Form $\overline{Z}_{rj} = \dot{B}_{ij}^T \tilde{W}^{ij} \ddot{B}_{ij}$ as in Equations 69 and 47
    For $c \in I_j|_{c \geq r}$
    {
      Form $\overline{Z}_{cj}^T$
      Sum in $-\overline{Z}_{rj}\ddot{Z}_j^{-1}\overline{Z}_{cj}^T$ into M·block(r, c).
    }//end c
    Sum in $-\overline{Z}_{rj}\ddot{Z}_j^{-1}\ddot{H}_j$ into C·block(r, 0).
  }//end r
}//end j
8. Complete the lower diagonal entries of M and solve $\Delta = M^{-1}C$. As in the full normal equation solution, note that M is symmetric and thus a symmetric system solver is in order.
9. First use pseudocode provided below to compute corrections to ground points. Then update all the parameters from the $\Delta$ vector.
10. If $(p) \neq 0$ compare with the previous RMS of residuals and check for convergence. The convergence condition is $$|R^{(p)} - R^{(p-1)}| < \varepsilon \qquad \text{Equation 105}$$

11. {computePostConvergenceResiduals+checkForBlunders} if convergence has been reached, perform automatic blunder editing as detailed elsewhere. After there are no more blunders, proceed with error propagation {propagateErrors}. If convergence has not been reached, increment the iteration index as in Equation 104 and go to step 5.

After the solution vector $\dot{\Delta}$ is obtained, unfolding the ground point corrections is a matter of employing Equation 80, replicated here for reference:

$$\ddot{\Delta}_j \atop 3 \times 1 = \ddot{Z}_j^{-1}\left[\ddot{H}_j - \sum_{i \in I_j} \overline{Z}_{ij}^T \dot{\Delta}_i\right] \qquad \text{Equation 80}$$

{unfoldGroundPoints}
for $j \in \{0, \ldots, n-1\}$
{
  Retrieve $\ddot{Z}_j^{-1}$ and $\ddot{H}_j$ from GPWS
  Store $\ddot{H}_j$ into a new subtrahend matrix S (i.e. initialize S to $\ddot{H}_j$)
  for $r \in I_j$
  {
    Form $\overline{Z}_{rj}$
    Sum $-\overline{Z}_{rj}^T \dot{\Delta}_r$ into S.
  }//end r
  Compute $\ddot{\Delta}_j = \ddot{Z}_j^{-1} S$
}//end j The general cross error covariance between ground point indexes r and c can obtained by evaluation of Equation 94.
{relativeGroundPointCov}
Retrieve $\ddot{Z}_r^{-1}$ and $\ddot{Z}_c^{-1}$ from ground point workspace.
Obtain indexing sets $I_r$ and $I^c$ (image indexes of ground points r and c)
Allocate matrix $$\ddot{\Sigma}_{r,c} \atop 3 \times 3$$

and initialize to zero. This is the output of this function.
Allocate matrix $$P \atop 3 \times 7$$

and initialize to zero

```
for t ∈ I_c
{
    Allocate matrix Q      and initialize to zero
                    3×7 for s ∈ I_r
    {
        Form Z_sr and Z_tc from Equation 47.
        (Note that for the reduced system, N̄ = Z)
        Extract Σ̂_st = Σ̂.getBlock( s, t ),
        where Σ̂ is as defined in Equation 93
        Set Q ← Q + Z_st^T Σ̂_st
    }//end s
    Set  P  ←  P  +  Q Z̄_rc
}//end t
Compute  Σ̈_r,c  =  Z̈_r^-1 P Z̈_c^-1
if(r = c)
{
    Set Σ̈_r,c ← [σ^(p)]^2 Z̈_c^-1 + Σ̈_r,c
}
return  Σ̈_r,c
//end   {relativeGroundPointCov}
```

The full 3n×3n ground covariance matrix $$\ddot{\Sigma}_{3n \times 3n}$$

may be obtained by invoking the method for r∈{1, 2, ..., n} and for c∈{r, r+1, ..., n}. Note that the indexing for c starts with r since the full ground covariance matrix is symmetric (i.e., build the upper triangle of $$\ddot{\Sigma}_{3n \times 3n}$$

and "reflect about the diagonal" to obtain the lower symmetric portion).

What follows regards how to perform operation 1014. The operation 1014 proceeds given the outputs of the MLSE techniques discussed. The compensation applies the inverse of the observation equation, accommodating the various relative frame offsets to arrive at compensated world space coordinates from misregistered world space coordinates $$V_{reg}^{W} = \text{Compensate}_i(V_{misreg}^{W}) \quad \text{Equation 106}$$

The motivation for providing the inputs and outputs in world space coordinates can be that is the native space of the inputs and desired space of the outputs for each element of each image's point cloud.

For an arbitrary misregistered vector $V_{misreg}^{W}$ on image i, the compensation formula can be performed as in Equation 107

$$V_{reg}^{w} = \frac{1}{(1 + s_i^{(p)})} T_i^T \left( V_{misreg}^{\overline{w}} - \overline{V}_i^{(O)R} - V_R^{W} \right) + \overline{V}_i^{(p)} + V_R^{W} \quad \text{Equation 107}$$

where $T_i$ is constructed from the solution vector $\theta_i^{(p)}$ and the other symbols in Equation 107 are defined elsewhere. Note that the values for $-\overline{V}_i^{(O)R} - V_R^{W}$ and $+\overline{V}_i^{(O)} + V_R^{W}$ and $T_i^T$ can be precomputed on a per image basis when applying Equation 107 for a time-efficient implementation.

Figure 11:
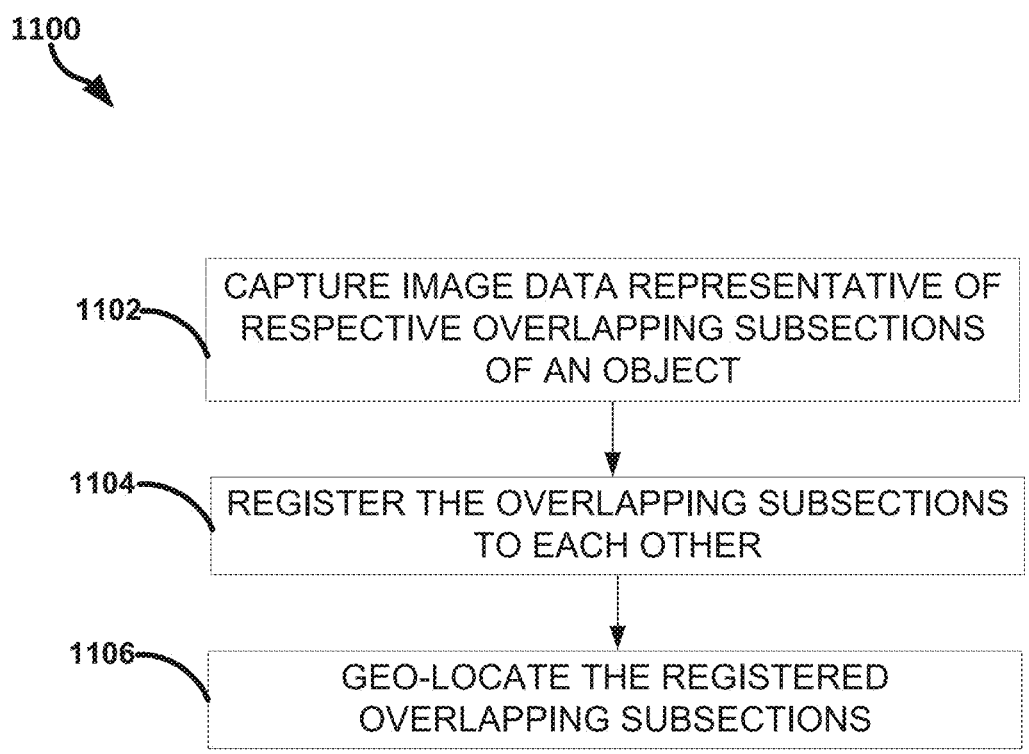

FIG. 11 illustrates, by way of example, a diagram of an embodiment of a method 1100 for 3D point set generation and registration. The method 1100 as illustrated includes capturing, by unmanned vehicles (UVs), image data representative of respective overlapping subsections of the object, at operation 1102; registering the overlapping subsections to each other, at operation 1104; and geo-locating the registered overlapping subsections, at operation 1106.

The method 1100 can include capturing, by a UV of the UVs, a first overhead image of a starting geo-location at which the image data is captured and wherein geo-locating the overlapping subsections includes correlating the first overhead image with a second overhead image for which geo-location is known. The method 1100 can include, wherein the second overhead image is a satellite image. The method 1100 can include, wherein geo-locating the registered overlapping subsection includes determining a normalized cross correlation of image chips of the first overhead image and the second overhead image.

The method 1100 can include receiving, from an operator of a UV of the UVs, a starting geo-location, and a heading of the UV. The method 1100 can include wherein geo-locating the registered overlapping subsections is performed based on the starting geo-location and the heading. The method 1100 can include performing, by a UV of the UVs, a light detection and ranging (LIDAR) scan to generate LIDAR scan data. The method 1100 can include wherein geo-locating the registered overlapping subsections includes correlating the first overhead image with the LIDAR scan data.

The method 1100 can include associating, by the UV, geo-location data of the UV with image data generated by the UV. The method 1100 can include, wherein geo-locating the registered overlapping subsections occurs based on the geo-location data. The method 1100 can include generating a first three-dimensional (3D) point set based on the geo-located registered overlapping subsections. The method 1100 can include registering the first 3D point set to a second 3D point set to generate a merged 3D point set. The method 1100 can include, wherein registering the first 3D point set to the second 3D point set includes scaling, rotating, and translating one or more of the first and second 3D point sets using a least squares estimate bundle adjustment based on tie points between the first and second 3D point sets.

Figure 12:
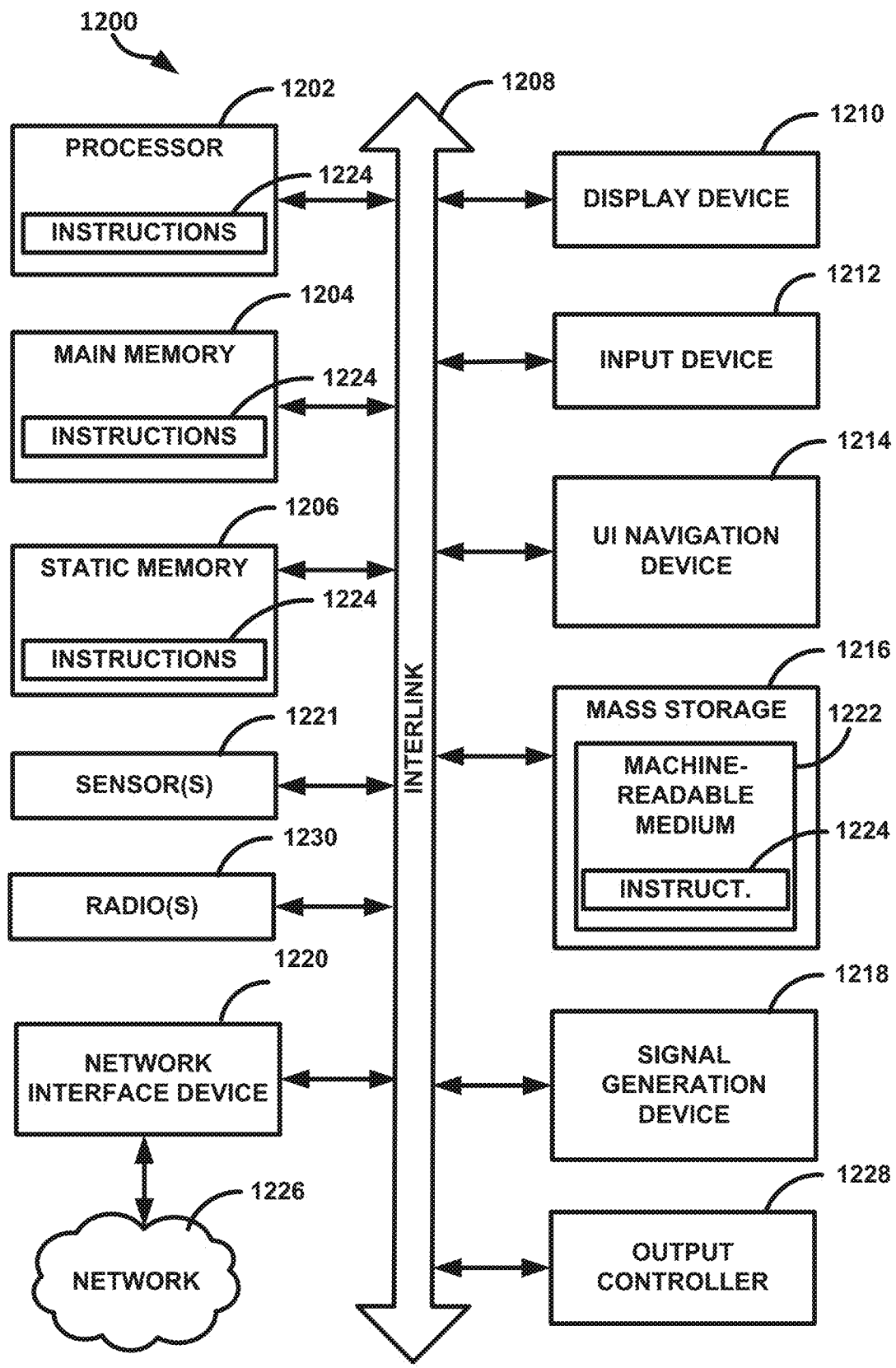
FIG. 12 illustrates, by way of example, a block diagram of an embodiment of a machine in the example form of a computer system within which instructions, for causing the machine to perform any one or more of the methodologies discussed herein, may be executed.

FIG. 12 illustrates, by way of example, a block diagram of an embodiment of a machine in the example form of a computer system 1200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., processing circuitry 118, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, or the like, or a combination thereof), a main memory 1204 and a static memory 1206, which communicate with each other via a bus 1208. The computer system 1200 may further include a display device 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker), a network interface device 1220, and radios 1230 such as Bluetooth, WWAN, WLAN, and NFC, permitting the application of security controls on such protocols.

The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Examples

Example 1 includes a method for generating a three-dimensional (3D) point cloud of an object, the method comprising capturing, by unmanned vehicles (UVs), image data representative of respective overlapping subsections of the object, registering the overlapping subsections to each other, and geo-locating the registered overlapping subsections.

In Example 2, Example 1 can further include capturing, by a UV of the UVs, a first overhead image of a starting geo-location at which the image data is captured and wherein geo-locating the overlapping subsections includes correlating the first overhead image with a second overhead image for which geo-location is known.

In Example 3, Example 2 can further include, wherein the second overhead image is a satellite image.

In Example 4, Example 3 can further include, wherein geo-locating the registered overlapping subsection includes determining a normalized cross correlation of image chips of the first overhead image and the second overhead image.

In Example 5 at least one of Examples 1-4 can further include receiving, from an operator of a UV of the UVs, a starting geo-location, and a heading of the UV, and wherein geo-locating the registered overlapping subsections is performed based on the starting geo-location and the heading.

In Example 6, at least one of Examples 2-5 can further include performing, by a UV of the UVs, a light detection and ranging (LIDAR) scan to generate LIDAR scan data, and wherein geo-locating the registered overlapping subsections includes correlating the first overhead image with the LIDAR scan data.

In Example 7, at least one of Examples 1-6 can further include associating, by the UV, geo-location data of the UV with image data generated by the UV, and wherein geo-locating the registered overlapping subsections occurs based on the geo-location data.

In Example 8, at least one of Examples 1-7 can further include generating a first three-dimensional (3D) point set based on the geo-located registered overlapping subsections and registering the first 3D point set to a second 3D point set to generate a merged 3D point set.

In Example 9, Example 8 can further include, wherein registering the first 3D point set to the second 3D point set includes scaling, rotating, and translating one or more of the first and second 3D point sets using a least squares estimate bundle adjustment based on tie points between the first and second 3D point sets.

Example 10 includes a system comprising unmanned vehicles configured to capture image data representative of respective overlapping subsections of an object, and processing circuitry configured to register the overlapping subsections to each other, and geo-locate the registered overlapping subsections.

In Example 11, Example 10 can further include, wherein a UV of the UVs is further configured to capture a first overhead image of a starting geo-location at which the image data is captured and wherein geo-locating the overlapping subsections includes correlating the first overhead image with a second overhead image for which geo-location is known.

In Example 12, Example 11 can further include, wherein the second overhead image is a satellite image.

In Example 13, Example 12 can further include, wherein geo-locating the registered overlapping subsection includes determining a normalized cross correlation of image chips of the first overhead image and the second overhead image.

In Example 14, at least one of Examples 10-13 can further include, wherein the processing circuitry is further configured to receive, from an operator of a UV of the UVs, a starting geo-location and a heading of the UAV, and wherein geo-locating the registered overlapping subsections is performed based on the starting geo-location and the heading.

In Example 15, at least one of Examples 11-14 can further include, wherein a UV of the UVs is further configured to perform a light detection and ranging (LIDAR) scan to generate LIDAR scan data; and wherein geo-locating the registered overlapping subsections includes correlating the first overhead image with the LIDAR scan data.

Example 16 includes a (e.g., non-transitory) machine-readable medium including instructions that, when executed by a machine, cause the machine to perform operations comprising receiving, by unmanned vehicles (UVs), image data representative of respective overlapping subsections of an object, registering the overlapping subsections to each other, and geo-locating the registered overlapping subsections.

In Example 17, Example 16 can further include, wherein the operations further comprise receiving, by the UV, geo-location data of the UV associated with the image data generated by the UV, and wherein geo-locating the registered overlapping subsections occurs based on the geo-location data.

In Example 18, at least one of Examples 16-17 can further include, wherein the operations further comprise generating a first three-dimensional (3D) point set based on the geo-located registered overlapping subsections and registering the first 3D point set to a second 3D point set to generate a merged 3D point set.

In Example 19, Example 18 can further include, wherein registering the first 3D point set to the second 3D point set includes scaling, rotating, and translating one or more of the first and second 3D point sets using a least squares estimate bundle adjustment based on tie points between the first and second 3D point sets.

In Example 20, at least one of Examples 16-19 can further include, wherein the operations further comprise receiving light detection and ranging (LIDAR) scan data of the object from a UV of the UVs; and wherein geo-locating the registered overlapping subsections includes correlating the first overhead image with the LIDAR scan data.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for generating a three-dimensional (3D) point cloud of an object, the method comprising:
capturing, by unmanned vehicles (UVs) dedicated to imaging respective overlapping subsections of an object, image data representative of the respective overlapping subsections of the object resulting in captured image data;
registering, by a geometric bundle adjustment, the captured image data of the overlapping subsections to each other resulting in registered overlapping subsections;
geo-locating, using registered tie points of the object, the registered overlapping subsections resulting in geo-located registered overlapping subsections;
generating a first three-dimensional (3D) point set based on the geo-located registered overlapping subsections; and
registering the first 3D point set to a second 3D point set to generate a merged 3D point set.

2. The method of claim 1, further comprising:
capturing, by a UV of the UVs, a first overhead image of a starting geo-location at which the image data is captured; and
wherein geo-locating the overlapping subsections includes correlating the first overhead image with a second overhead image for which geo-location is known.

3. The method of claim 2, wherein the second overhead image is a satellite image generated by a satellite.

4. The method of claim 3, wherein geo-locating the registered overlapping subsection includes determining a normalized cross correlation between image chips of the first overhead image and image chips of the second overhead image.

5. The method of claim 1, further comprising:
receiving, from an operator of a UV of the UVs, a starting geo-location, and a heading of the UV; and
wherein geo-locating the registered overlapping subsections is performed based on the starting geo-location and the heading.

6. The method of claim 2, further comprising:
performing, by a UV of the U-Vs, a light detection and ranging (LIDAR) scan to generate LIDAR scan data; and
wherein geo-locating the registered overlapping subsections includes correlating the first overhead image with the LIDAR scan data.

7. The method of claim 1, further comprising:
associating, by the geo-location data of the UV with image data generated by the UV; and
wherein geo-locating the registered overlapping subsections occurs based on the geo-location data.

8. The method of claim 1, wherein registering the first 3D point set to the second 3D point set includes scaling, rotating, and translating one or more of the first and second 3D point sets using a least squares estimate bundle adjustment based on tie points between the first and second 3D point sets.

9. A system comprising:
unmanned vehicles (UVs) configured to capture image data representative of respective overlapping subsections of an object to generate captured image data, each of the UVs dedicated to imaging a respective overlapping subsection of the overlapping subsections of the object; and
processing circuitry configured to:
register, by a geometric bundle adjustment, the captured image data of the overlapping subsections to each other resulting in registered overlapping subsections;
geo-locate, using registered tie points of the object, the registered overlapping subsections resulting in registered overlapping subsections;
generating a first three-dimensional (3D) point set based on the geo-located registered overlapping subsections; and
registering the first 3D point set to a second 3D point set to generate a merged 3D point set.

10. The system of claim 9, wherein a UV of the UVs is further configured to capture a first overhead image of a starting geo-location at which the image data is captured and wherein geo-locating the overlapping subsections includes correlating the first overhead image with a second overhead image for which geo-location is known.

11. The system of claim 10, wherein the second overhead image is a satellite image.

12. The system of claim 11, wherein geo-locating the registered overlapping subsection includes determining a normalized cross correlation of image chips of the first overhead image and the second overhead image.

13. The system of claim 9, wherein the processing circuitry is further configured to:
receive, from an operator of a UV of the UVs, a starting geo-location, and a heading of the UAV; and wherein geo-locating the registered overlapping subsections is performed based on the starting geo-location and the heading.

14. The system of claim 10, wherein a UV of the UVs is further configured to perform a light detection and ranging (LIDAR) scan to generate LIDAR scan data; and
wherein geo-locating the registered overlapping subsections includes correlating the first overhead image with the LIDAR scan data.

15. A non-transitory machine-readable medium including instructions that, when executed by a machine, cause the machine to perform operations comprising:
receiving, by unmanned vehicles (UVs), captured image data representative of respective overlapping subsections of an object, the captured image data including images from UVs dedicated to imaging an overlapping subsection of the respective overlapping subsections of the object;
registering, by a geometric bundle adjustment, the captured image data of the overlapping subsections to each other resulting in registered overlapping subsections;
geo-locating, using registered tie points of the object, the registered overlapping subsections resulting in geo-located registered overlapping subsections;
generating a first three-dimensional (3D) point set based on the geo-located registered overlapping subsections; and
registering the first 3D point set to a second 3D point set to generate a merged 3D point set.

16. A non-transitory machine-readable medium of claim 9, wherein the operations further comprise:
receiving, by the UV, geo-location data of the UV associated with the image data generated by the UV; and
wherein geo-locating the registered overlapping subsections occurs based on the geo-location data.

17. A non-transitory machine-readable medium of claim 15, wherein registering the first 3D point set to the second 3D point set includes scaling, rotating, and translating one or more of the first and second 3D point sets using a least squares estimate bundle adjustment based on tie points between the first and second 3D point sets.

18. The machine-readable medium of claim 15, wherein the operations further comprise receiving light detection and ranging (LIDAR) scan data of the object from a UV of the UVs; and wherein geo-locating the registered overlapping subsections includes correlating the first overhead image with the LIDAR scan data.

* * * * *